(12) United States Patent
Sato

(10) Patent No.: US 7,365,952 B2
(45) Date of Patent: Apr. 29, 2008

(54) BATTERY PACK HAVING A PROTECTION CIRCUIT

(75) Inventor: Bunya Sato, Fukushima (JP)

(73) Assignee: Sony Corporation, Tokyo (JP)

( * ) Notice: Subject to any disclaimer, the term of this patent is extended or adjusted under 35 U.S.C. 154(b) by 251 days.

(21) Appl. No.: 10/721,638

(22) Filed: Nov. 24, 2003

(65) Prior Publication Data

US 2004/0109274 A1   Jun. 10, 2004

(30) Foreign Application Priority Data

Nov. 28, 2002   (JP)  ............................ P2002-345648
Dec. 19, 2002   (JP)  ............................ P2002-368163

(51) Int. Cl.
   *H02J 7/00*   (2006.01)
   *H02J 7/04*   (2006.01)
   *H02J 7/06*   (2006.01)

(52) U.S. Cl. ...................... 361/90; 320/106; 320/139; 320/122

(58) Field of Classification Search ................ 320/134, 320/135, 136, 118, 106, 139, 122, 138; 307/141.8
   See application file for complete search history.

(56) References Cited

U.S. PATENT DOCUMENTS

| | | | | |
|---|---|---|---|---|
| 3,480,940 A | * | 11/1969 | Lieser | 340/530 |
| 4,767,977 A | * | 8/1988 | Fasen et al. | 320/148 |
| 6,150,797 A | * | 11/2000 | Mukainakano | 320/134 |
| 6,242,893 B1 | * | 6/2001 | Freedman | 320/135 |
| 6,403,261 B2 | * | 6/2002 | Mitkin et al. | 429/231.8 |
| 6,563,292 B2 | * | 5/2003 | Fujiwara | 320/134 |

* cited by examiner

*Primary Examiner*—Michael Sherry
*Assistant Examiner*—Zeev Kitov
(74) *Attorney, Agent, or Firm*—Sonnenschein Nath & Rosenthal LLP

(57) ABSTRACT

The battery pack according to the present invention is to avoid any trouble or the like of the primary or secondary battery inside the battery pack with a simple mechanical construction when a load is intermittently connected between the external terminals of the battery pack. For this end, the battery pack includes at least the battery cell and a protection circuit for shutting off overcurrent discharge and features in the provision of shut-off holding means and releasing means. The shut-off holding means maintains discharge shut-off condition after abnormal discharge shut-off by shorting or connecting a low resistance between the external plus terminal and the external minus terminal from outside of the battery pack. The releasing means releases the shut-off condition of the shut-off holding means when a predetermined voltage is applied between the external plus terminal and the external minus terminal.

5 Claims, 31 Drawing Sheets

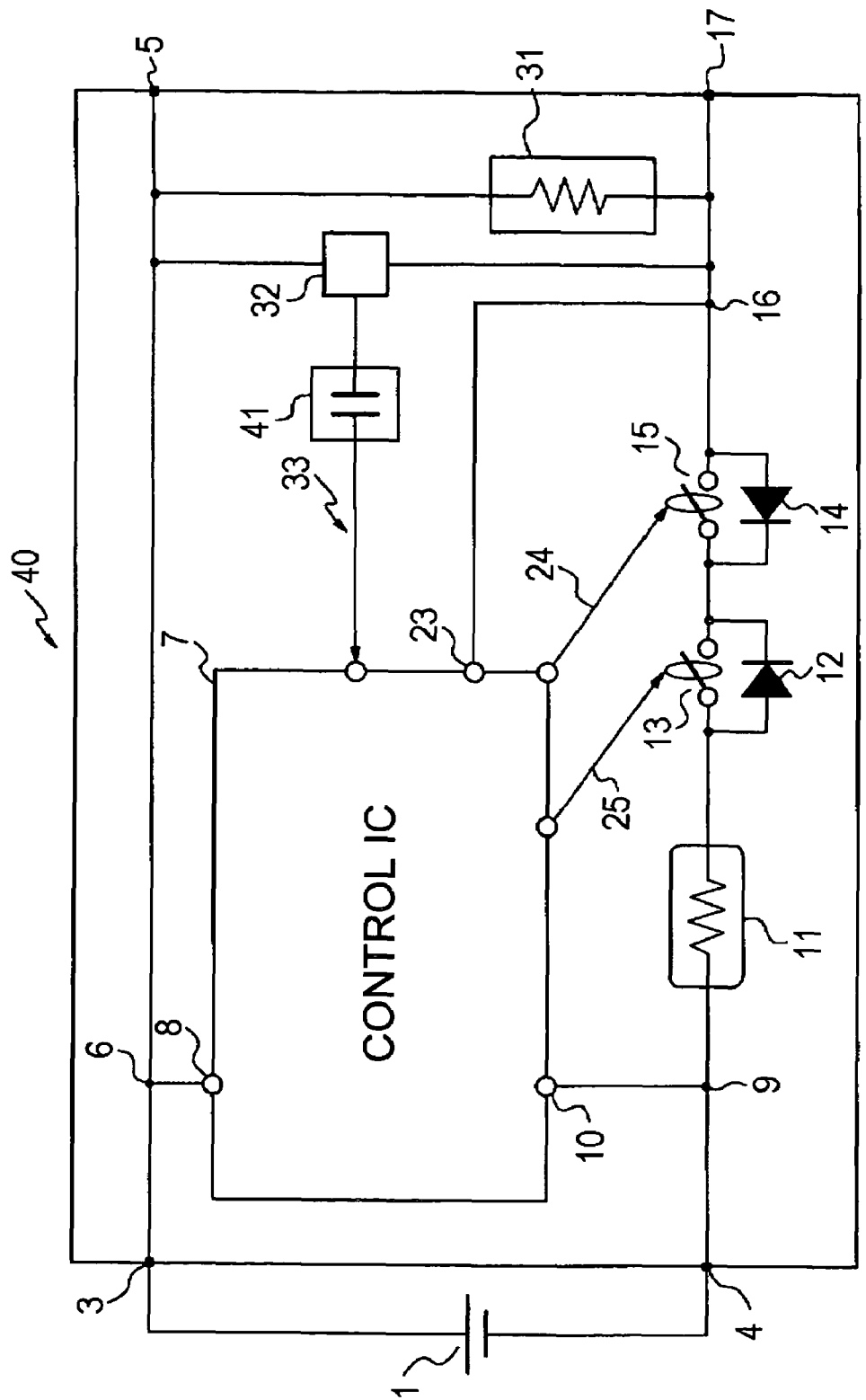

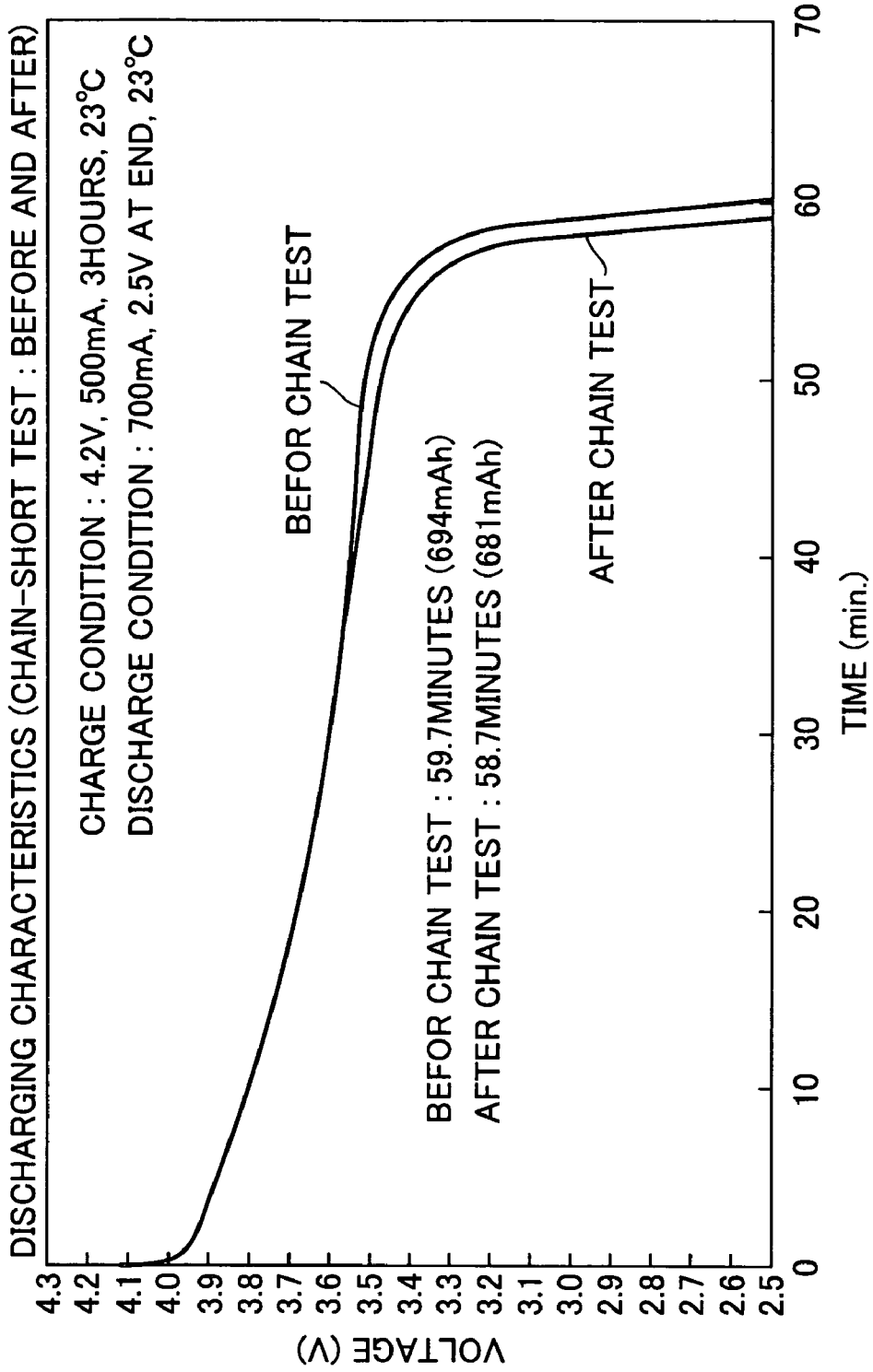

BATTERY PACK HAVING A PROTECTION CIRCUIT

BACKGROUND OF THE INVENTION

1. Field of the Invention

The present invention relates to a battery pack to be used as a power supply for, for example, digital still cameras, personal computers, video cameras, cellular phones, etc., and more specifically to a battery pack provided with a protection circuit which shuts off discharge in case when external plus and minus terminals of such battery pack are short-circuited.

2. Description of Related Art

In a conventional battery pack including, for example, secondary batteries, if a large discharge current in excess of the rated discharge current is forced to flow, it is possible that performance of the secondary batteries degrade and decrease their discharge capacity or damage the secondary battery themselves.

In order to solve such problems, it is typical to provide a protection circuit inside the battery pack for protecting a primary or secondary battery from such overcurrent discharge by turning OFF (or opening), for example, a discharging control switch in order to shut off the discharge current whenever a current in excess of a predetermined current value flows from the battery pack over a predetermined time, thereby protecting the primary or secondary battery from overcurrent.

In addition to the above protection circuit, it is general to improve safety by providing a recessed portion on the outer surface of the pack and disposing external terminals of the battery pack in the recessed portion so that the external terminals do not easily make electrical contact with any external metal. However, if it is constructed to dispose the external terminals in the recessed portion, assembling processes are increased and adversely affecting the working efficiency and in turn increasing the production cost as compared to the case of disposing the external terminals on the surface of the battery pack. As a matter of fact, such conventional approach does not basically provide protection of the primary or secondary battery.

FIG. 29 shows one example of such conventional protection circuit. In FIG. 29, an internal battery as accommodated inside the battery pack (referred to as a battery cell 1 hereinafter) is connected to a battery cell positive terminal 3 of a protection circuit 2 at the positive side of the battery cell 1 while connecting to a battery cell negative terminal 4 at the negative side of the battery cell 1.

The battery cell positive terminal 3 is connected to an external plus terminal 5 and also connected to a positive side power supply terminal 8 of a control IC 7 by way of a junction 6.

On the other hand, the battery cell negative terminal 4 is connected to a negative side power supply terminal 10 of the control IC 7 and a resistor 11 by way of a junction 9.

The resistor 11 is connected to an anode side of a diode 12 and also a discharging control switch 13. The diode 12 and the discharging control switch 13 are connected in parallel with each other and the cathode side of the diode 12 and the other terminal of the discharging control switch 13 are connected to a cathode side of a diode 14 and a charging control switch 15.

The diode 14 and the charging control switch 15 are connected in parallel. The other end of the charging control switch 15 and the anode side of the diode 14 are connected to an external minus terminal 17 of the protection circuit 2 by way of a junction 16.

For example, voltage detectors 18, 19, an operational amplifier 20, a resistor 21, a switch 22, etc. are disposed inside the control IC 7. The positive side power supply terminal 8 is connected to the negative side power supply terminal 10 by way of the voltage detector 18.

The voltage detector 18 is also connected to the voltage detector 19 and the resistor 21. The resistor 21 is connected to the switch 22 which is connected to the voltage detector 19 and an overcurrent voltage detection terminal 23.

The overcurrent voltage detection terminal 23 is connected to the external minus terminal 17 of the protection circuit 2 by way of the junction 16.

The voltage detector 18 detects the voltage between the battery cell positive terminal 3 and the battery cell negative terminal 4, i.e., between the positive side and the negative side of the battery cell 1. On the other hand, the voltage detector 19 detects the entire voltage across the resistor 11, the diodes 12, 14, the discharging control switch 13 and the charging control switch 15 which are connected between the battery cell negative terminal 4 and the external minus terminal 17.

Voltage detection results detected by these voltage detectors 18, 19 are supplied to the operational amplifier 20 which controls the switch 22 in response to the abovementioned voltage detection results.

In case of charging and discharging the battery pack, the discharging control switch 13 and the charging control switch 15 are designed to be controlled in response to control signals from the control IC 7.

It is to be noted here that both discharging control switch 13 and the charging control switch 15 are in the ON (or closed) condition in case when the battery pack is in the normal condition, i.e., when the battery cell 1 is discharging its current into a load (not shown) connected between the external plus terminal 5 and the external minus terminal 17 and in case of charging the battery cell 1 by a charger (not shown) connected between the external plus terminal 5 and the external minus terminal 17.

In other words, under the normal condition when both of the discharging control switch 13 and the charging control switch 15 are ON (closed), discharge and charge operations can be performed freely.

When the voltage of the battery cell 1 is equal to or higher than the predetermined voltage, i.e., in the fully charged condition, the discharging control switch 13 remains in the ON (closed) condition but the charging control switch 15 becomes OFF (open) condition in response to a charging control signal 24 from the control IC 7.

When the charging control switch 15 is in the OFF (open) condition as mentioned above, the diode 14 allows discharging into the load while disabling to charge the battery cell 1, thereby protecting the battery cell 1 from over-charging.

In case when the voltage of the battery cell 1 decreases below the predetermined voltage, i.e., in the over-discharging condition, the charging control switch 15 is in the ON (closed) condition while the discharging control switch 13 is turned OFF (open) by a discharging control signal 25 from the control IC 7.

In the OFF (open) condition of the discharging control switch 13 as mentioned above, the function of the diode 12 allows charging of the battery cell 1 but disabling to discharge into the load, thereby protecting the battery cell 1 from over-discharge.

Moreover, in case when a low resistor or a conductor such as, for example, an electrical wire is connected to short-circuit between the external plus terminal 5 and the external minus terminal 17 from outside of the battery pack, the charging control switch 15 is in the ON (closed) condition while the discharging control switch 13 is in the OFF (open) condition, thereby not discharging into the load.

As described above, in case when the external plus terminal 5 and the external minus terminal 17 are short-circuited in the conventional protection circuit, it is determined to be overcurrent if discharge current in excess of, for example, approximately 4 A flows over about 0.01 second, thereby shutting off the discharge current by turning OFF (open) the discharging control switch 13.

A condition to recover the condition protected from the overcurrent, i.e., the ON (closed) condition of the discharging control switch 13 from the OFF (open) condition is that the resistance externally connected to external terminals of the battery pack increases to, for example, approximately 100 kΩ to 200 MΩ or larger.

Accordingly, in case when a trouble occurs in the internal circuit of an electronic apparatus or the like to which the battery pack is connected and the resistance of the electronic apparatus becomes, for example, 0.8 Ω or lower, the discharging control switch 13 is turned OFF (open) and such condition is maintained.

As for a circuit for protecting the primary or secondary battery from overcurrent, proposed is an overcurrent protection circuit for a battery in which switch means is turned off, for example, upon detection by current detection means of a current larger than a predetermined value flowing out of the battery and automatically returning the switch means after lapse of a predetermined time which is automatically adjusted in substantially proportion to the current value detected by the current detection means (see Patent Document 1).

According to the prior art as disclosed in the Patent Document 1, in case when a current larger than a predetermined value flows out of the battery for a period longer than a predetermined time, switch means is turned off and allows the discharge current to flow.

Also disclosed is a provision of a movable shield plate corresponding to the charging terminal and a movable shield plate corresponding to the power supply terminal, thereby preventing any serious trouble such as overheating, catching fire, etc. (see Patent Document 2).

Patent Document 1: Japanese patent No.3272104
Patent Document 2: Japanese non-examined patent publication No. H9-320554

However, in case of repetitively connecting and disconnecting a load between the external terminals of the battery pack in the conventional overcurrent protection circuits, for example, in case of connecting a metal chain of a necklace chain or the like between the external terminals of the battery pack (referred to as chain-short below), the discharging control switch 13 repeats ON and OFF conditions, thereby repeating a large current discharge and decreasing the discharge capacity of the battery pack, causing a trouble in the primary or secondary battery, smoking from the battery pack, making the plastic case of the battery pack non-usable because of partial melting or distortion by the heated metal chain or the like. Moreover, the user may be burned by the heat. In order to avoid such trouble, it is normal in some battery packs to recommend in their instruction manuals or the like that the user mounts a plastic terminal cover for protecting the external terminals of the battery pack or warns the user not to connect a metal chain of a necklace or the like.

In case of connecting a metal chain of a necklace or the like between the external terminals of the battery pack, there causes repetitive connection and disconnection of the load because, although the metal chain appears to be mechanically always connected between the external terminals, a large current develops oxidation or the like on the contacting surfaces between adjacent rings of the chain, thereby electrically repeating connection and disconnection, i.e., substantially 0 Ω and substantially ∞Ω.

Accordingly, in case when the battery pack and a metal chain of a necklace or the like are put together in a bag or the like, the metal chain makes contact between the external terminals of the battery pack, thereby causing a trouble in the battery pack depending on situations.

As a concrete example of connecting such metal chain or the like between the external terminals of the battery pack, shown in FIG. 30 is the relationship between the amplitude of the discharge current, the surface temperature of the external plus terminal 5 (positive terminal temperature), the surface temperature of the external minus terminal 17 (negative terminal temperature) and the surface temperature of the battery pack (cell surface temperature) when a Kihei-type iron chain is connected between the external terminals of the battery pack.

As apparent from FIG. 30, in case of connecting a metal chain or the like between the external terminals of the battery pack, it is understood that overcurrent discharge is repeated, thereby particularly increasing the surface temperature of the external plus terminal (positive terminal temperature).

FIG. 31 shows a graph of discharging characteristics for measuring a discharge capacity of a battery pack before and after the repetitive overcurrent discharge.

As apparent from FIG. 31, in case of connecting a metal chain or the like between the external terminals of a battery pack, it is understood that the discharge capacity decreases after the chain-short test as compared to before the chain-short test.

In the prior art as disclosed in the above Patent Document 1, in case when, for example, a load substantially equal to the resistance of the battery is repetitively connected, overcurrent flows repetitively out of the battery, thereby possibly causing a problem to damage the primary or secondary battery in the battery back.

On the other hand, the prior art as disclosed in the Patent Document 2 is complex in mechanical construction, difficult to manufacture and high in production cost.

Accordingly, the conventional battery packs have problems to be solved so that, even in case when a load is repetitively connected and disconnected between the external terminals of the battery pack, the primary or secondary battery in the battery pack is protected not to cause any trouble and yet the mechanical construction is simple.

SUMMARY OF THE INVENTION

As specific means to solve the above problems associated with the prior art, a first invention according to the present invention is a battery pack including at least a battery cell and a protection circuit for shutting off overcurrent discharge, and features in the provision of shut-off holding means for shutting off any abnormal discharge due to shorting or connection of a low resistance between the external plus terminal and the external minus terminal from outside of the battery pack and releasing means for releasing the shut-off by the shut-off holding means upon applying a predetermined voltage between the external plus terminal and the external minus terminal from outside of the battery pack.

In the first invention, additional requirements include that the shut-off holding means is 1 kΩ or larger resistance block connected between the battery cell positive terminal inside the battery pack and the releasing means is a detector disposed between the external plus terminal and the external minus terminal to detect application of a predetermined voltage between the both terminals.

A second invention according to the present invention is a battery pack including at least a battery cell and a protection circuit for shutting off overcurrent discharge, and features in that the protection circuit comprises shut-off holding means of a 1 kΩ or larger resistance block connected between the battery cell positive terminal and the external minus terminal and a detector for the voltage between the external plus terminal and the external minus terminal, wherein any abnormal discharge due to shorting or connection of a low resistance between the external plus terminal and the external minus terminal from outside of the battery pack is shut off, the shut-off holding means maintains the discharge shut-off until releasing the shut-off of the discharge and recovering the discharge by the shut-off holding means upon detection by the detector of a predetermined voltage applied between the external plus terminal and the external minus terminal from outside of the battery pack.

In the first and second inventions, additional requirements include that the detector is either a charging detector, a voltage detector, a voltage change detector, an A.C. resistance detector or a voltage dropper, the detector is connected to a differentiation circuit or an one-shot circuit, discharge shut-off by the shut-off holding means is a discharging control switch connected between the battery cell negative terminal and the external minus terminal, discharge shut-off by the shut-off holding means is a discharging control switch connected between the battery cell positive terminal and the external plus terminal, and the discharging control switch is either a mechanical switch, a transistor or a field effect transistor.

Further, in the first and second invention, additional requirements include that, in case of a circuit configuration having a capacitor or a voltage smoother connected between the external plus terminal and the external minus terminal and the discharging control switch is connected to the battery minus terminal, a resistor is connected between the external minus terminal and a voltage supply terminal for overcurrent shut-off recovery or the overcurrent voltage detection terminal of the control IC in the protection circuit, alternatively in case of a circuit configuration of the discharging control switch connected to the battery plus terminal, a resistor is connected between the external plus terminal and the voltage supply terminal for overcurrent shut-off recovery or the overcurrent voltage detection terminal of the control IC in the protection circuit; the releasing means for releasing the overcurrent discharge shut-off comprises a p-channel field effect transistor, a resistor and a capacitor, the drain terminal of the p-channel field effect transistor and the switch control terminal of the discharging control switch are connected, the source terminal of the p-channel field effect transistor and the external plus terminal are connected, a resistor is connected in parallel between the source and gate terminals of the p-channel field effect transistor, and a capacitor is connected between the gate terminal of the p-channel field effect transistor and the external minus terminal; the releasing means for releasing the overcurrent discharge shut-off comprises a PNP junction transistor, a resistor and a capacitor, the collector terminal of the transistor and the switch control terminal of the discharging control switch are connected, the emitter terminal of the transistor and the external plus terminal are connected, and the base terminal of the transistor and the external minus terminal are connected with a block which is a series connection of a resistor having a resistance value of 0 Ω or larger and a capacitor; the releasing means for releasing the overcurrent discharge shut-off comprises an n-channel field effect transistor, a resistor and a capacitor, the drain terminal of the n-channel field effect transistor and the switch control terminal of the discharging control switch are connected, the source terminal of the n-channel field effect transistor and the external minus terminal are connected, a resistor is connected in parallel between the source and gate terminals of the n-channel field effect transistor, and a capacitor is connected between the gate terminal of the n-channel field effect transistor and the external plus terminal; the releasing means for releasing the overcurrent discharge shut-off comprises an NPN junction transistor, a resistor and a capacitor, the collector terminal of the transistor and the switch control terminal of the discharging control switch are connected, the emitter terminal of the transistor and the external minus terminal are connected, and a block of a series connection of a resistor having a resistance value of 0 Ω or larger and a capacitor is connected between the base terminal of the transistor and the external plus terminal; the releasing means for releasing the overcurrent discharge shut-off comprises an inductor, a first capacitor, a second capacitor, and a diode, the inductor and the first capacitor are connected in series, the other end of the inductor is connected to the external plus terminal, the other end of the first capacitor is connected to the external minus terminal, the second capacitor is connected to the junction of the inductor and the first capacitor, the other end of the second capacitor and the anode of the diode are connected in series, and the cathode of the diode is connected to the switch control terminal of the discharging control switch; the releasing means for releasing the overcurrent discharge shut-off comprises an inductor, a first capacitor, a second capacitor, and a diode, the inductor and the first capacitor are connected in series, the other end of the first capacitor is connected to the external plus terminal, the other end of the inductor is connected to the external minus terminal, the second capacitor is connected to the junction of the inductor and the first capacitor, the other end of the capacitor and the cathode of the diode are connected, and the anode of the diode is connected to the switch control terminal of the discharging control switch.

The battery pack according to the present invention features in shutting off abnormal discharge due to short-circuit or connection of a low resistance between the external plus terminal and the external minus terminal from outside of the battery pack, and application of predetermined voltage between the external plus terminal and the external minus terminal from outside of the battery pack releasing the discharge shut-off to recover discharge. Accordingly, even if the shorting condition between the external terminals of the battery pack may be intermittently repeated, the discharge shut-off is maintained at a first shorting condition, thereby avoiding any trouble or the like of the primary or secondary battery inside the battery pack and providing safety with simpler mechanical construction.

In summary, the first aspect of the present invention is directed to the battery pack including at least a battery cell and a protection circuit for shutting off an overcurrent discharge and features in the provision of shut-off holding means for shutting off abnormal discharge due to shorting or connection of a low resistance between the external plus terminal and the external minus terminal from outside of the battery pack and releasing means for releasing the shut-off by the shut-off holding means due to application of a predetermined voltage between the external plus terminal and the external minus terminal from outside of the battery pack. Accordingly, the present invention has an excellent advantage of increasing safety by protecting the primary or secondary battery inside the battery pack from a trouble or the like with a simpler mechanical construction because the discharge shut-off is maintained at a first occurrence of the shorted condition even if the shorted condition of the battery pack terminals is intermittently repeated.

Similarly, the second aspect of the present invention is directed to the battery pack including at least a battery cell and a protection circuit for shutting off overcurrent discharge and features in that the protection circuit is provided with shut-off holding means having a 1 kΩ or larger resistor block connected between the battery cell positive terminal and the external minus terminal and a detector for detecting the voltage between the external plus terminal and the external minus terminal for shutting off abnormal discharge upon detecting shorting or connection of a low resistance between the external plus terminal and the external minus terminal from outside of the battery pack, and the shut-off holding means maintaining the discharge shut-off until the shut-off holding means releases the discharge shut-off and recovering discharge upon detection by the detector that a predetermined voltage is applied between the external plus terminal and the external minus terminal from outside of the battery pack. Accordingly, the present invention has an excellent advantage of increasing safety by protecting the primary or secondary battery inside the battery pack from any trouble or the like with a simpler mechanical construction in case of the chain-short condition or the like because the discharge shut -off at a first discharge is maintained even if shorted condition between the external terminals of the battery pack is intermittently repeated.

BRIEF DESCRIPTION OF THE DRAWINGS

In the accompanying drawings:

FIGS. 2A, 2B show a battery pack, wherein FIG. 2A is a simplified bottom view and FIG. 2B is a front view;

FIG. 3 is a simplified circuit schematic of a battery pack protection circuit of a second embodiment according to the present invention;

FIG. 31 shows discharge characteristic curves for measuring the discharge capacity before and after testing the conventional battery pack in FIG. 14.

DETAILED DESCRIPTION OF THE PREFERRED EMBODIMENTS

Figure 1:
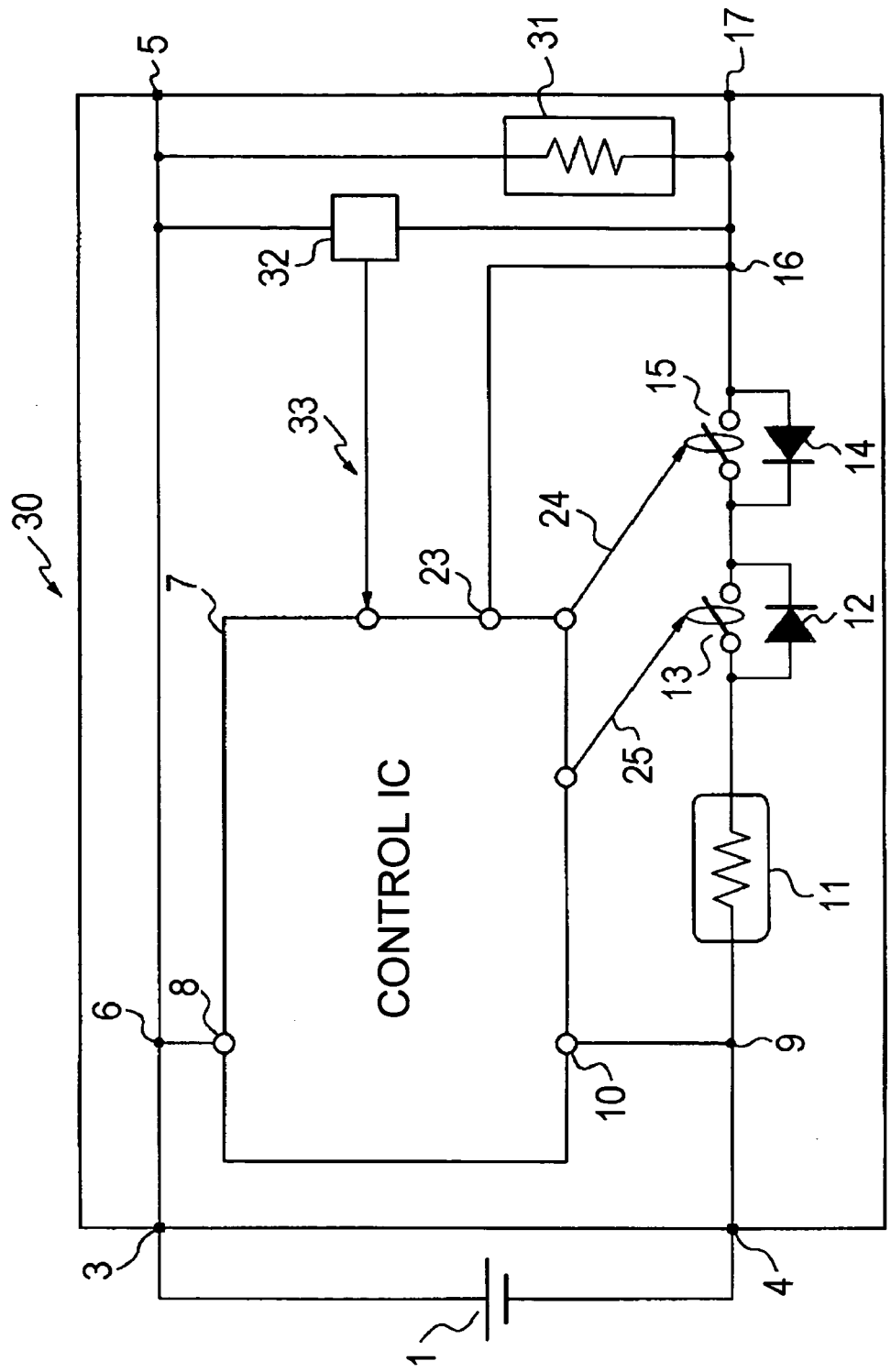
FIG. 1 is a simplified circuit schematic of a first embodiment of the battery pack protection circuit according to the present invention.

Now, the present invention will be described in detail based on specific embodiments. It is to be noted that, in a first embodiment, the same reference numerals as the above-mentioned prior art are used for the corresponding elements in order to avoid duplicated detailed description. Additionally, the control IC 7 should not be limited to the one as shown in the prior art and it may be replaced by any other control IC.

FIG. 1 shows a simplified circuit schematic of the first embodiment of the battery pack protection circuit 30 according to the present invention. As for a battery cell 1 to be connected to the protection circuit 30 may be either a primary battery or a secondary battery. Moreover, the battery cell 1 may comprise a combination of more than one batteries. For example, it may be a series connection of two battery cells.

The battery cell 1 and the protection circuit 30 are accommodated in a battery pack. The protection circuit 30 is provided with a resistor block 31 having 1 kΩ or larger resistance for maintaining shut-down of discharge by shut-down holding means connected between the battery cell positive terminal 3 and the external minus terminal 17. Preferably, the resistor block 31 has 1 kΩ or larger resistance but not exceeding 200 MΩ.

A detector 32 as a charger detector is also disposed and connected between the external plus terminal 5 and the external minus terminal 17 for continuously detecting the voltage between the external plus terminal 5 and the external minus terminal 17. In FIG. 1, the detector 32 and the resistor block 31 are connected in parallel between the external plus terminal 5 and the external minus terminal 17.

Other than the abovementioned charger detector, it is possible to use, for example, a voltage detector, an A.C. (alternate current) resistor detector, a voltage dropper, etc. as the detector 32.

The voltage between the external plus terminal 5 and the external minus terminal 17 as detected by the detector 32 is applied to an input terminal 33 for an overcurrent shut-off releasing signal of the control IC 7. In other words, it is the detector 32 as the charger detector to detect the charging voltage between the external plus terminal 5 and the external minus terminal 17 and to apply the detection result to the input terminal 33 as the overcurrent shut-off releasing signal.

If the detected charging voltage is normal, both of the discharging control switch 13 and the charging control switch 15 are in the ON (closed) condition, thereby enabling to charge the battery cell 1. On the other hand, if the detected charging voltage is abnormal, such abnormal voltage is detected by the detector 32 or the control IC 7 and the charging control switch 15 is turned OFF (open) by the charging control signal 24 from the control IC 7. Under this condition, the battery cell 1 can not be charged and thus protecting the battery cell 1 from abnormal charging voltage.

In case when the external plus terminal 5 and the external minus terminal 17 of the protection circuit 30 are short-circuited by an electrical wire or the like or interconnected with a load having a low resistance from outside of the battery pack, a large current is forced to flow out of the battery cell 1. Such abnormal condition is detected by an overcurrent voltage detection terminal 23 of the control IC 7 which outputs a discharging control signal 25 to turn the discharging control switch 13 into the OFF (open) condition while maintaining the charging control switch 15 in the ON (closed) condition. As a result, the discharging is shut off, i.e., making it into a condition under which discharging is disabled. Other than the mechanical switch, it is also possible to use, for example, a transistor (a Field Effect Transistor) or the like as the discharging control switch 13.

Under the discharging shut-off condition, the resistance block 31 is connected between the battery cell positive terminal 3 and the external minus terminal 17, thereby maintaining the discharging shut-off condition while preventing from returning to the discharging condition.

In order to release the discharge shut-off condition, a predetermined voltage is applied between the external plus terminal 5 and the external minus terminal 17 from outside of the battery pack. Upon detecting the predetermined voltage by the detector 32, such detection result is applied to the input terminal 33 for the overcurrent shut-off releasing signal of the control IC 7. The discharging control signal 25 is outputted from the control IC 7 for making the discharging control switch 13 into the ON (closed) condition, thereby releasing the discharge shut-off condition and returning to the normal condition under which charging and discharging can be performed freely.

As an example of releasing the discharge shut-off condition, when the battery pack is connected to a charger (not shown), for example, the voltage measured between the external plus terminal 5 and the external minus terminal 17 is approximately 4.2 volts. Such voltage is compared by the detector 32 (a charger detector) with the predetermined voltage, 4.0 volts. If it is determined that the measured voltage is higher than the preset voltage and a charger is connected, the overcurrent shut-off releasing signal (a discharging current shut-off releasing signal) is applied to the control IC 7, thereby releasing the discharge shut-off condition.

As another example of releasing the discharge shut-off condition, when the battery pack is connected to a charger (not shown), for example, an A.C. resistance as measured between the external plus terminal 5 and the external minus terminal 17 is 200 mΩ. The detector (either an A.C. resistance detector or a charger detector) 32 compares with a preset A.C. resistance, 300 mΩ. If is it determined that the A.C. resistance is lower than the preset A.C. resistance and a charger is connected, an overcurrent shut-off releasing signal (a discharge current shut-off releasing signal) is applied to the control IC 7 for releasing the discharge shut-off condition.

As mentioned above, since it is sufficient if connection of a charger (not shown) between the external plus terminal 5 and the external minus terminal 17 can be detected, the way of such detection is not limited to these examples and detection may be made by any other method.

In other words, in case when once abnormal condition of overcurrent discharge occurs, since the discharge shut-down condition is maintained, the discharging control switch 13 remains in the OFF (open) condition, i.e., the discharge shut-down condition is maintained even if, for example, a metal chain or the like of a necklace or the like (not shown) is repetitively connected between the external plus terminal 5 and the external minus terminal 17 (chain-short). As a result, the primary or secondary battery of the battery pack is protected from causing a trouble or the like, thereby increasing safety because smoking or temperature rise due to such trouble is effectively prevented.

The abovementioned predetermined voltage for releasing the discharge shut-down condition is set, for example, as the voltage of a charger (not shown), thereby allowing the user to start charging by simply connecting the battery pack to the charger. This means that the user can easily return to the normal condition and allowing the user to normally use the battery pack under the normal condition.

Figure 2A:
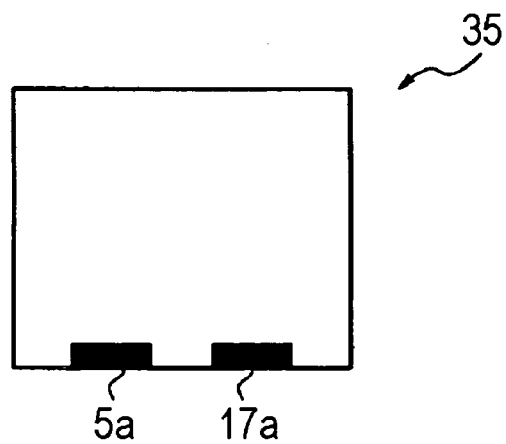
Figure 2B:
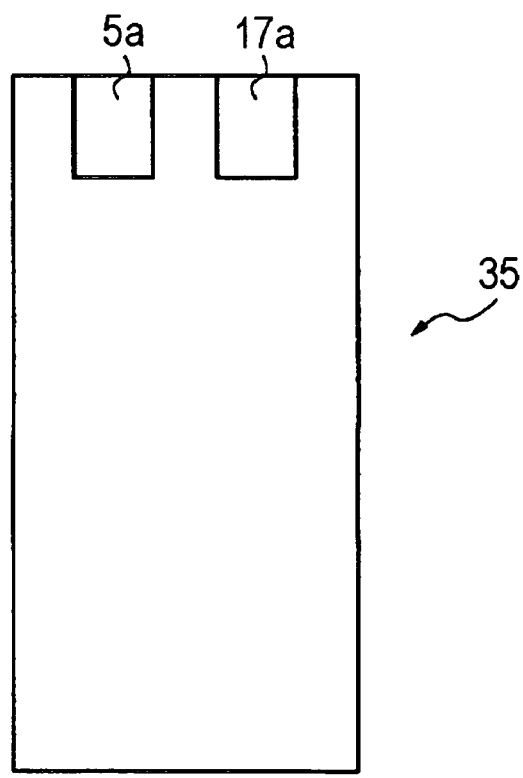

Now, FIG. 2A shows a simplified bottom view of the battery pack and FIG. 2B is the front view of the battery pack. As described hereinabove, even if the chain-short may occur in the battery pack 35 of the present invention, the discharge shut-off condition is maintained immediately when the abnormal condition due to overcurrent discharge occurs, thereby increasing safety and making it possible to dispose the external plus terminal 5a and the external minus terminal 17a substantially flush with the bottom surface of the battery pack 35 as shown in FIGS. 2A and 2B. Accordingly, there is no need to provide a recessed portion on the bottom surface of the battery pack 35 for disposing the external terminals and thus the configuration of the charging portion of a charger (not shown) can be simplified, the production cost can be reduced and design restrictions can be minimized.

Now, FIG. 3 shows a simplified circuit schematic of a second embodiment of the battery pack protection circuit 40 according to the present invention. In the second embodiment, a differentiation circuit 41 is interposed and connected between the detector 32 and the control IC 7. Since the other construction is the same as the abovementioned first embodiment, the same reference numerals as the first embodiment are used for the corresponding elements in order to avoid duplicated detailed description.

In the second embodiment, a voltage detector is used as the detector 32 and a capacitor is connected as the differentiation circuit 41 between the detector 32 and the control IC 7. It is to be noted that no differentiation circuit 41 may be connected in the same manner as the first embodiment even if the voltage detector is used as the detector 32.

In the above configuration, by applying the output or the overcurrent shut-off signal (discharging current shut-off releasing signal) from the detector (such as a voltage detector or the like) 32 to the control IC 7 by way of the differentiation circuit (capacitor) 41, in case when the voltage between the external plus terminal 5 and the external minus terminal 17 is equal to or higher than the preset voltage, it is configured so that the overcurrent shut-off releasing signal is applied only to the control IC 7 for an initial given period of time.

It is to be noted that, instead of using the differentiation circuit (capacitor) 41, an one-shot circuit or the like may be used so as to apply an overcurrent shut-off releasing signal only for one time to the control IC 7 in case when the voltage between the external plus terminal 5 and the external minus terminal 17 is equal to or higher than the predetermined voltage.

Figure 4:
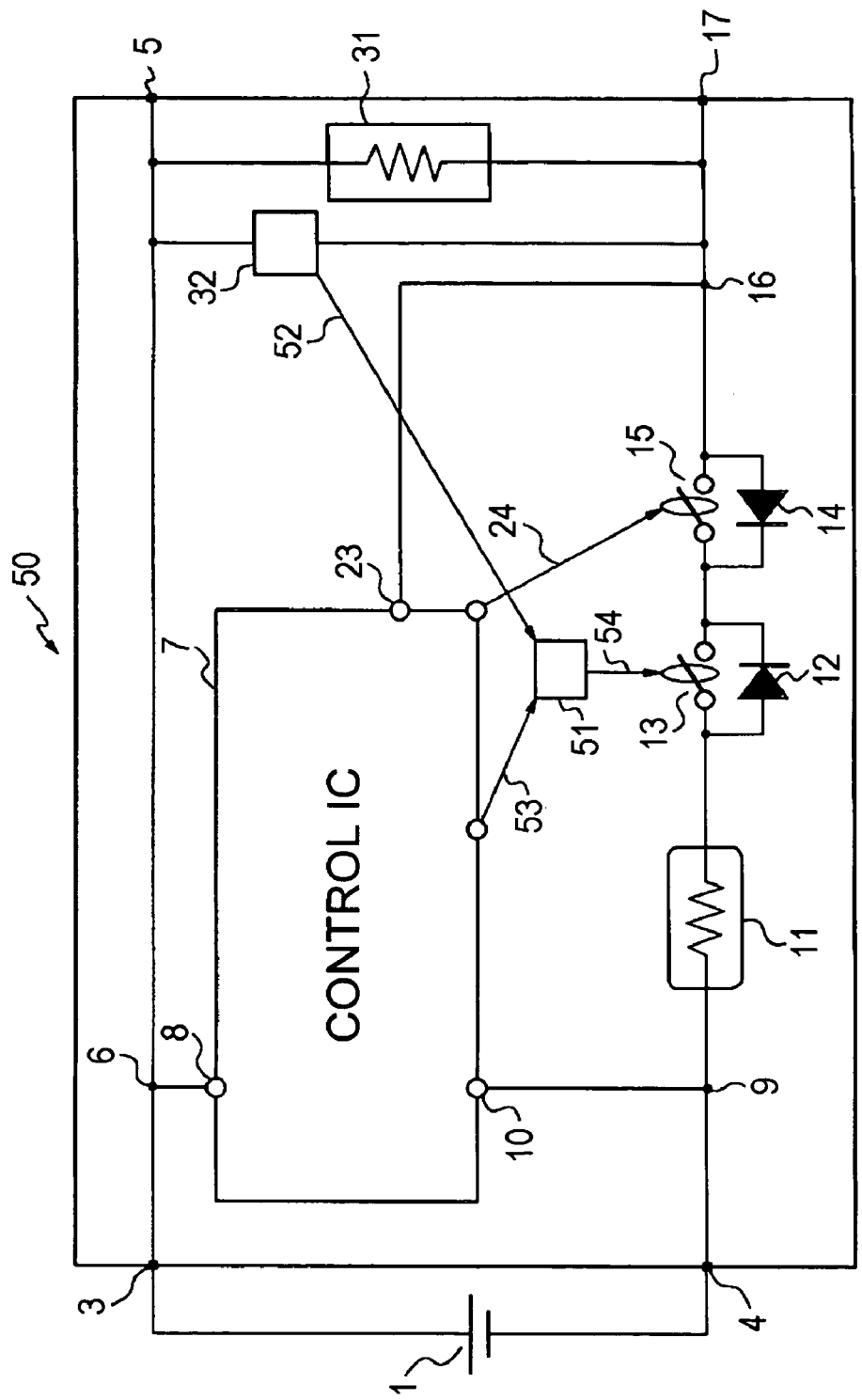
FIG. 4 is a simplified circuit schematic of a third embodiment of the battery pack protection circuit according to the present invention.

Now, FIG. 4 is a simplified circuit schematic of the battery pack protection circuit 50 of a third embodiment according to the present invention. In the third embodiment, the signal from the detector 32 is applied to a processor 51 separated from the control IC 7. Since the other construction is substantially same as the first embodiment, the same reference numerals as the first embodiment are used for the corresponding constituent elements in order to avoid duplicated detailed description.

In the third embodiment, a voltage detector is used as the detector 32. In case when the voltage detector detects that the voltage between the external plus terminal 5 and the external minus terminal 17 is equal to or higher than the predetermined voltage, a discharging switch connection signal 52 from the detector 32 is applied to the processor 51.

A discharging switch connection signal 53 is also applied to the processor 51 from the control IC 7. The processor 51 calculates the discharging switch connection signal 52 and the discharging switch connection signal 53 and a calculated signal 54 recovers the ON (closed) condition, i.e., the normal condition of the discharging control switch 13, for example, when the both signals are HIGH.

As described hereinabove, since it is sufficient if the discharging control switch 13 is controlled by the signal from the detector 32, the circuit configuration is not limited to the shown embodiment. For example, it is possible to combine the second embodiment and the third embodiment, i.e., the discharging switch connection signal 52 is applied to the processor 51 by way of the differentiation circuit 41 for controlling the discharging control switch 13.

Figure 5:
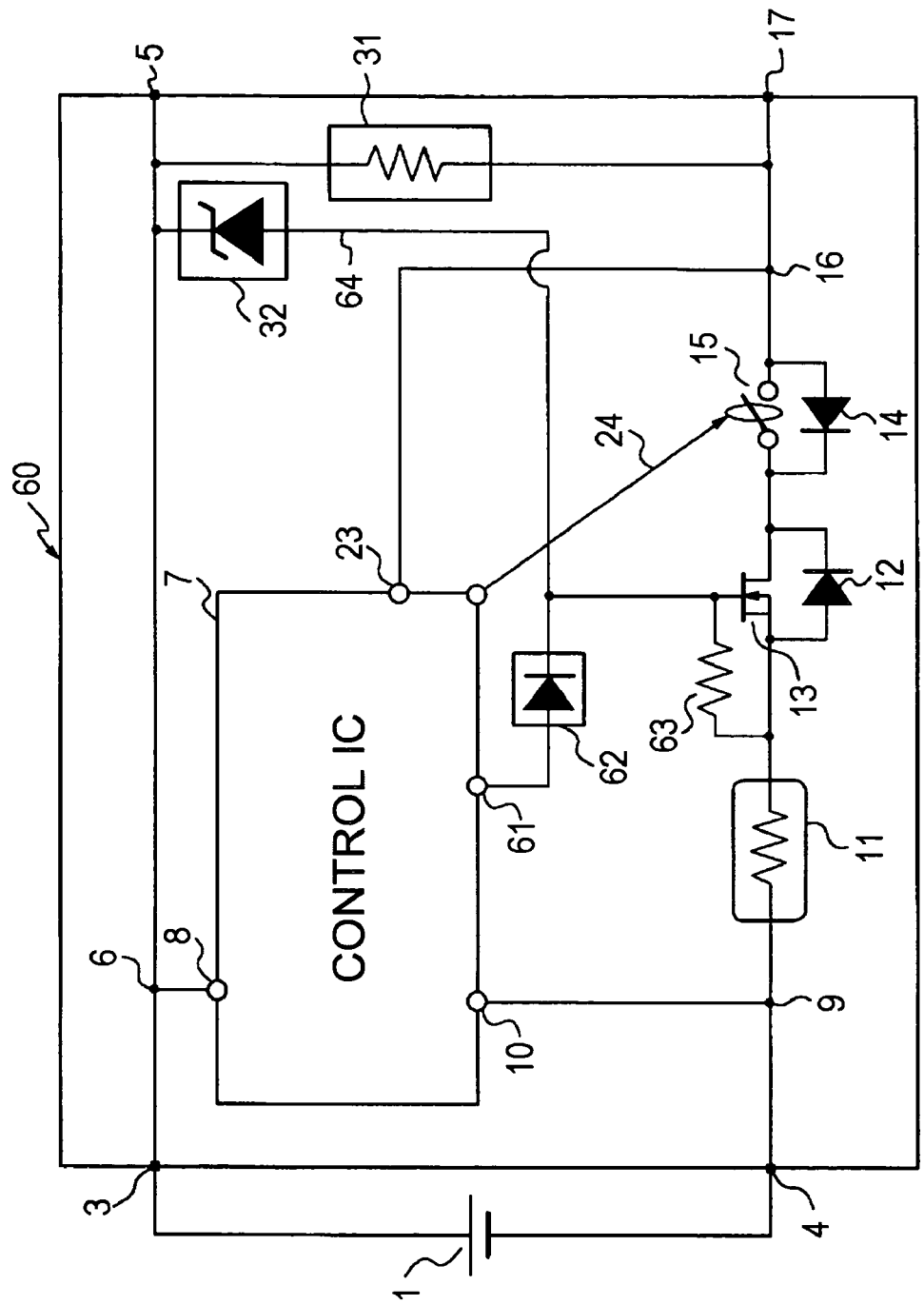
FIG. 5 is a simplified circuit schematic of a fourth embodiment of the battery pack protection circuit according to the present invention.

FIG. 5 is a simplified circuit schematic of a fourth embodiment of the battery pack protection circuit 60 according to the present invention. In the fourth embodiment, a transistor (Field Effect Transistor) is used as the discharging control switch 13. Since the other construction is substantially the same as the first embodiment, the same reference numerals as the first embodiment are used for the corresponding elements in order to avoid duplicated detailed description.

In the fourth embodiment, a discharging switch connection signal 61 from the control IC 7 is applied to the discharging control switch 13 by way of a reverse current prevention device (diode) 62. A resistor 63 is connected between the gate terminal and the source terminal of the field effect transistor defining the discharging control switch 13.

Also, a voltage dropper (Zener diode) is used as the detector 32. In case when the voltage on the external plus terminal 5 exceeds the break-down voltage of the detector (Zener diode) 32, a discharging switch connection signal 64 is applied to the discharging control switch (Field Effect Transistor) 13, i.e., the gate terminal of the field effect transistor defining the discharging control switch 13. By applying the discharging switch connection signal 64 to the discharging control switch 13, the discharging control switch 13 is turned to the ON condition, or returning to the normal condition.

Figure 6:
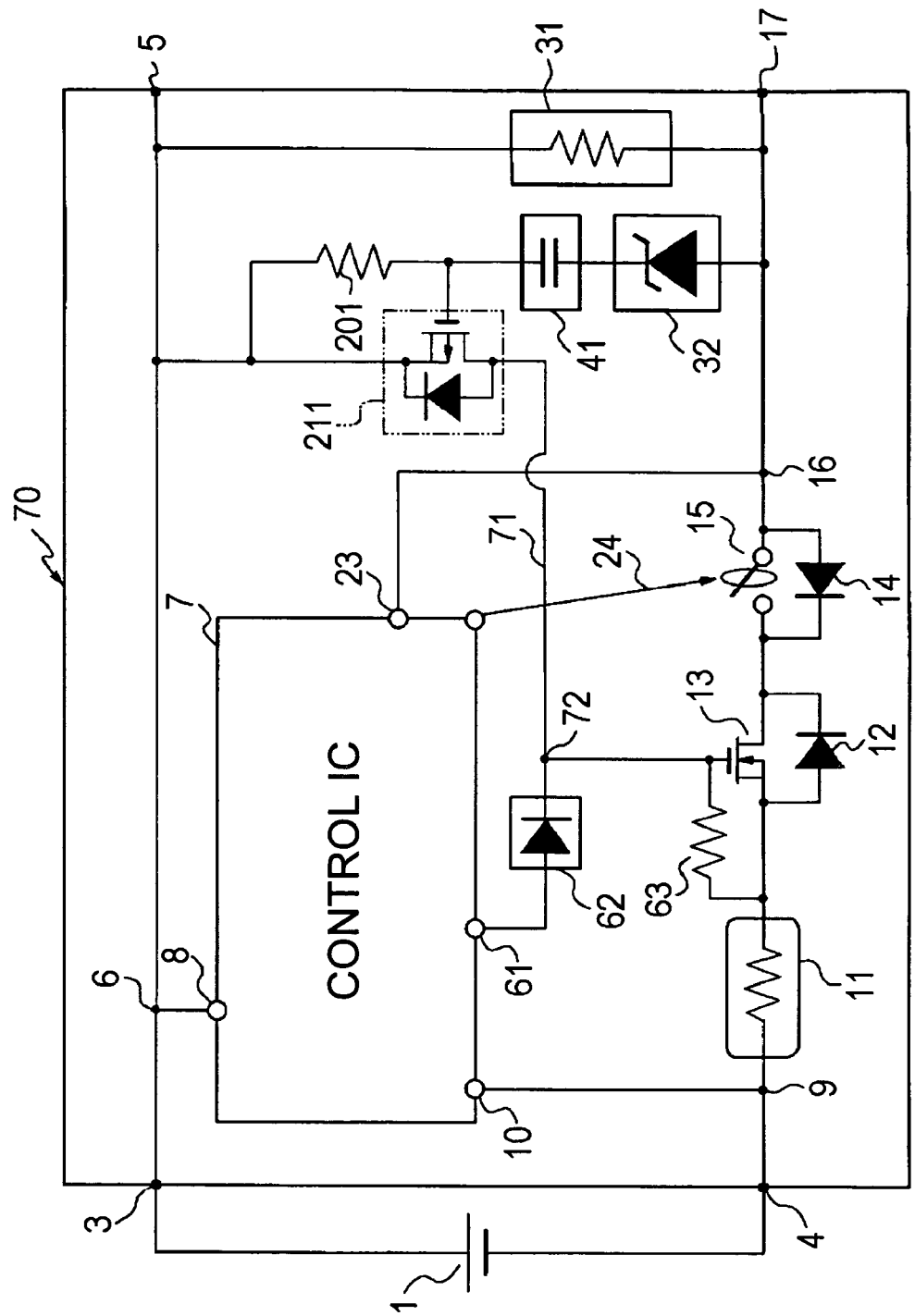
FIG. 6 is a simplified circuit schematic of a fifth embodiment of the battery pack protection circuit according to the present invention.

FIG. 6 is a simplified circuit schematic of the battery pack protection circuit 70 of a fifth embodiment according to the present invention. In the fifth embodiment, a detector 32 is connected between the external minus terminal 17 and the differentiation circuit 41 in the fourth embodiment. Since the other construction is substantially the same as the first to fourth embodiments, the same reference numerals as the first to fourth embodiments are used for the corresponding elements in order to avoid duplicated detailed description.

In the fifth embodiment, a voltage dropper (Zener diode) is employed as the detector 32 and the voltage on the external minus terminal 17 is applied to the differentiation circuit (capacitor) 41 by way of the detector (Zener diode) 32.

The differentiation circuit 41 is connected to the external plus terminal 5 by way of a resistor 201. An overcurrent shut-off releasing switch 211 is connected between the differentiation circuit 41 and the resistor 201.

As shown in FIG. 6, the overcurrent shut-off releasing switch 211 comprises, for example, a field effect transistor and a diode with the source and drain terminals of the field effect transistor being connected to the cathode and the anode of the diode, respectively.

In other words, the differentiation circuit 41 and the resistor 201 are connected to the gate terminal of the field effect transistor defining the overcurrent shut-off releasing switch 211. The source terminal of the field effect transistor and the cathode of the diode are connected to the external plus terminal 5 while the drain terminal of the field effect transistor and the anode of the diode are connected to a discharging switch signal junction 72.

As a result, in case when a predetermined voltage, for example, the charging voltage of a charger is applied to the external plus terminal 5, a current flows through the differentiation circuit 41 for only an initial given time. When the voltage equal to or higher than the detection voltage of the detector 32 is applied to the detector 32, the differentiation circuit 41 switches the control signal of the overcurrent shut-off releasing switch 211 to the ON condition and turns on the overcurrent shut-off releasing switch 211. The external plus terminal and the control terminal of the discharging control switch are then electrically interconnected, thereby making the overcurrent shut-off releasing switch 211 to apply the discharging switch connection signal 71 to the discharging control switch 13. As a result, the discharging control switch 13 is turned to the ON condition and switches the voltage between the battery minus terminal and the external minus terminal to zero (0) volt, thereby returning to the normal condition.

Accordingly, for example, in case when the charging voltage of the charger is applied, the voltage between the source terminal and the gate terminal of the p-channel field effect transistor defining a part of the overcurrent shut-off releasing switch 211 switches from zero (0) volt to about −2 volts, thereby operating to connect the source terminal and the drain terminal of the overcurrent shut-off releasing switch 211. The transition voltage when the resistance between the source terminal and the drain terminal of the p-channel field effect transistor is low is approximately −2 volts.

It is to be noted that a current limiter (resistor) or the like may be used as the detector 32 and the reverse current protector (diode) 62 may be replaced by a current limiter (resistor) or the like.

A resistor or the like may be connected between the discharging switch signal junction 72 and the discharging control switch 13. Moreover, the resistor 63 may be replaced by a voltage smoother (capacitor) or the like.

Figure 7:
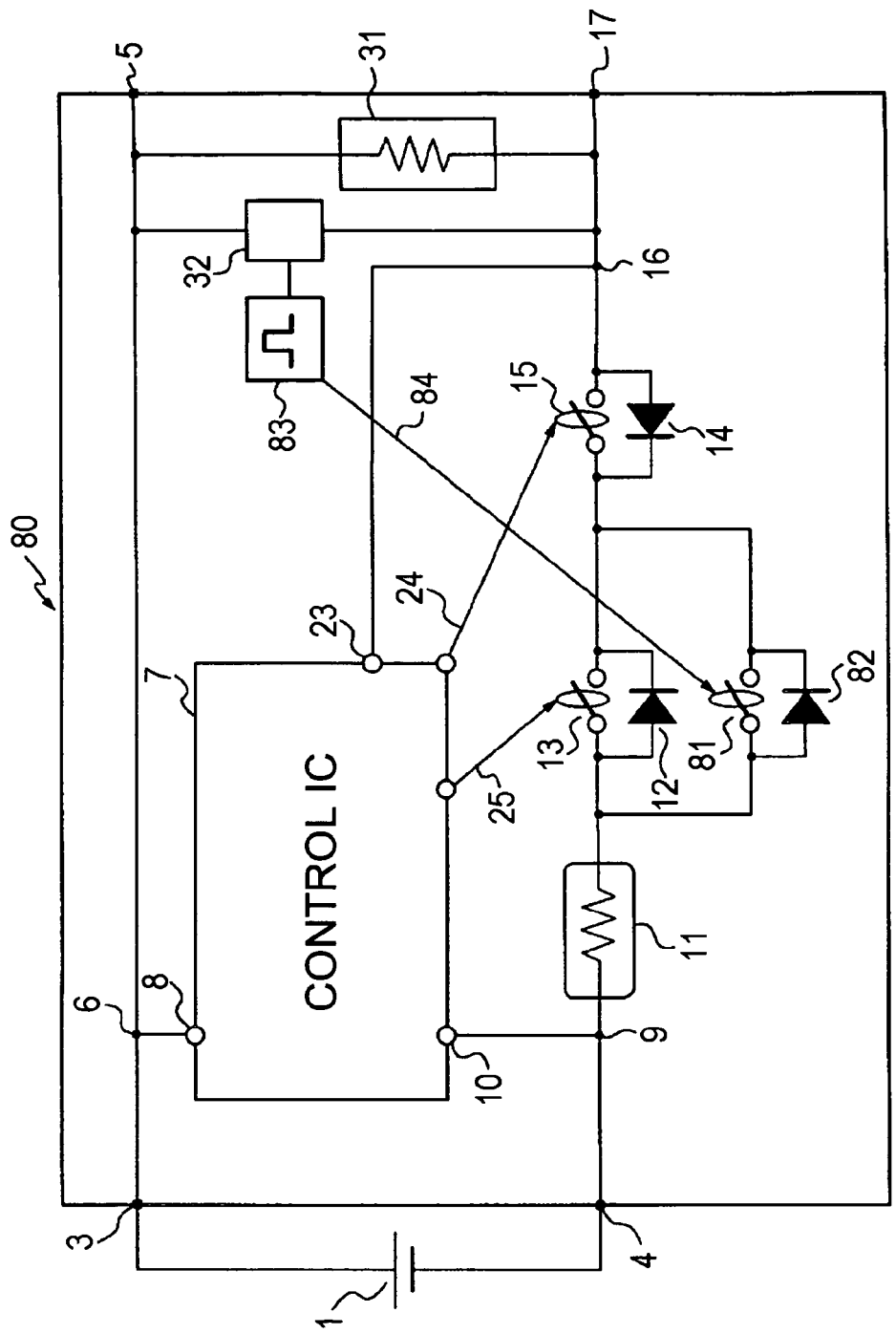
FIG. 7 is a simplified circuit schematic of a sixth embodiment of the battery pack protection circuit according to the present invention.

FIG. 7 is a simplified circuit schematic of a sixth embodiment of the battery pack protection circuit 80 according to the present invention. In the sixth embodiment, a discharging control switch (switch) 81 and a diode 82 are connected in parallel with the diode 12 and the discharging control switch (switch) 13 and the output of the detector 32 is applied to the discharging control switch 81 by way of an one-shot circuit 83. Since all other construction is substantially the same as the first embodiment, the same reference numerals are used for the corresponding elements in order to avoid duplicated detailed description.

In the sixth embodiment, discharge control by the control IC 7 is carried out by the discharging control switch 13 while discharge control by the one-shot circuit 83 is carried out by the discharging control switch 81, thereby separating the discharge control into two.

In other words, in case of abnormal condition due to overcurrent discharge, the discharging control switch 13 is turned OFF (open) to achieve the discharging shut-off condition. In case when a charger (not shown) is connected between the external plus terminal 5 and the external minus terminal 17, the detector 32 detects and outputs any voltage change by, for example, a voltage change detector.

By outputting the discharging switch connection signal 84 to the discharging control switch 81 from the one-shot circuit 83 in response to the output of the detector (voltage change detector) 32 for only one time, the discharging control switch 81 turns ON (closed) to recover the normal condition from the discharging shut-off condition.

In case of separating the route for the discharging control signal 25 of the control IC 7 from the route for the discharging switch connection signal 84 of the one-shot circuit 83, there is completely no influence of the control IC 7 upon the discharging switch connection signal 84 of the one-shot circuit 83, thereby further increasing control stability.

Figure 8:
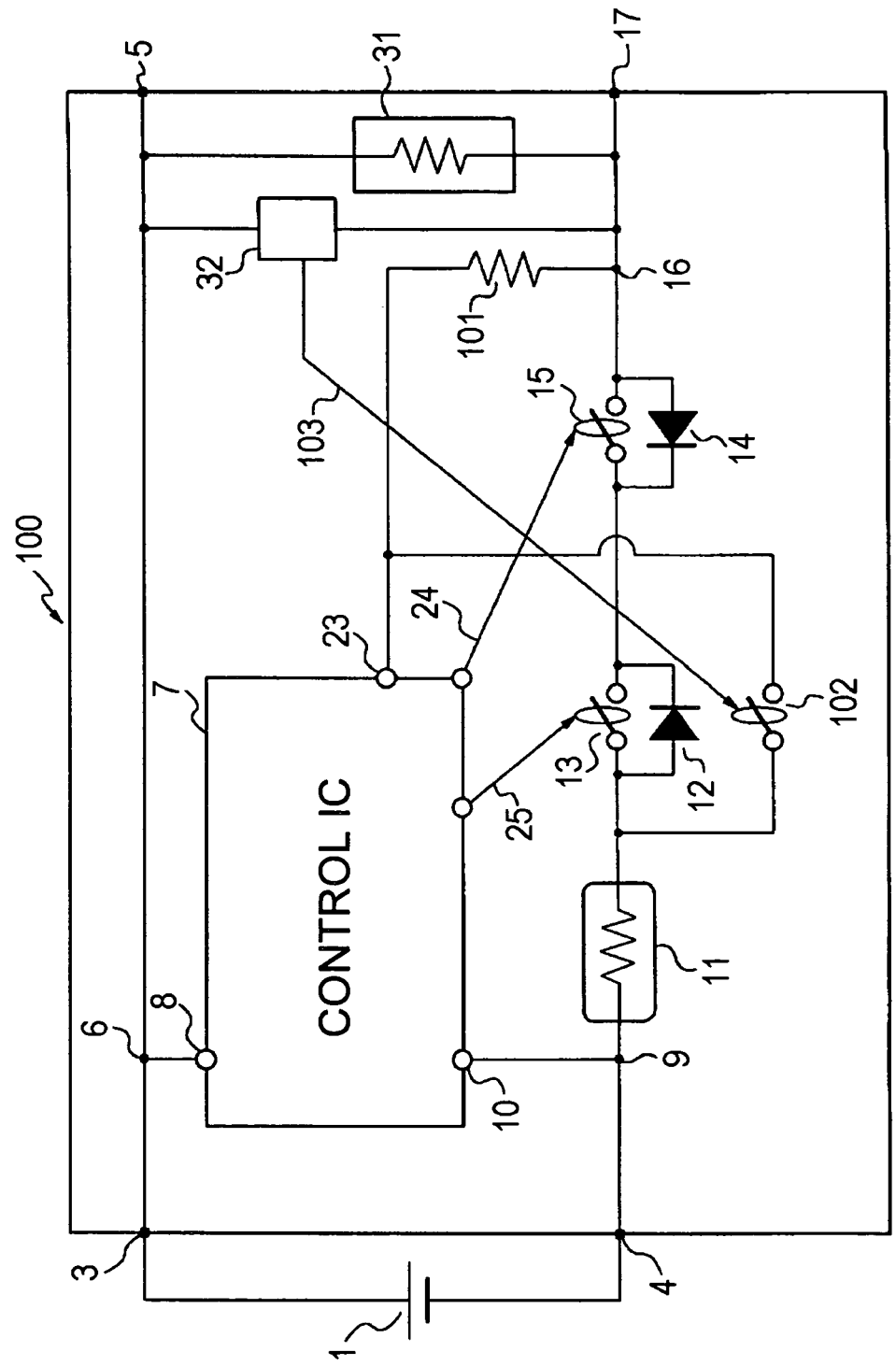
FIG. 8 is a simplified circuit schematic of a seventh embodiment of the battery pack protection circuit according to the present invention.

FIG. 8 is a simplified circuit schematic of a seventh embodiment of the battery pack protection circuit 100 according to the present invention. Again, since the seventh embodiment is substantially the same as the first embodiment, the same reference numerals as the first embodiment are used for the corresponding elements in order to avoid duplicated detailed description.

In the seventh embodiment, a resistor 101 is connected between the junction 16 and the overcurrent voltage detection terminal 23. In other words, the external minus terminal 17 and the overcurrent voltage detection terminal 23 are connected together by way of the resistor 101.

Also connected at the anode side of the diode 12 is an overcurrent shut-off condition recovering switch 102 while the other end of the overcurrent shut-off condition recovering switch 102 is connected between the resistor 101 and the overcurrent voltage detection terminal 23.

In case when a predetermined voltage is applied between the external plus terminal 5 and the external minus terminal 17, the detector 32 detects the voltage change or the like to output the overcurrent shut-out condition recovering switch connection signal 103 to the overcurrent shut-off condition recovering switch 102. Accordingly, the overcurrent shut-off condition shut-off condition recovering switch 102 is made in the ON (closed) condition to recover the normal condition from the discharging shut-off condition.

Figure 9:
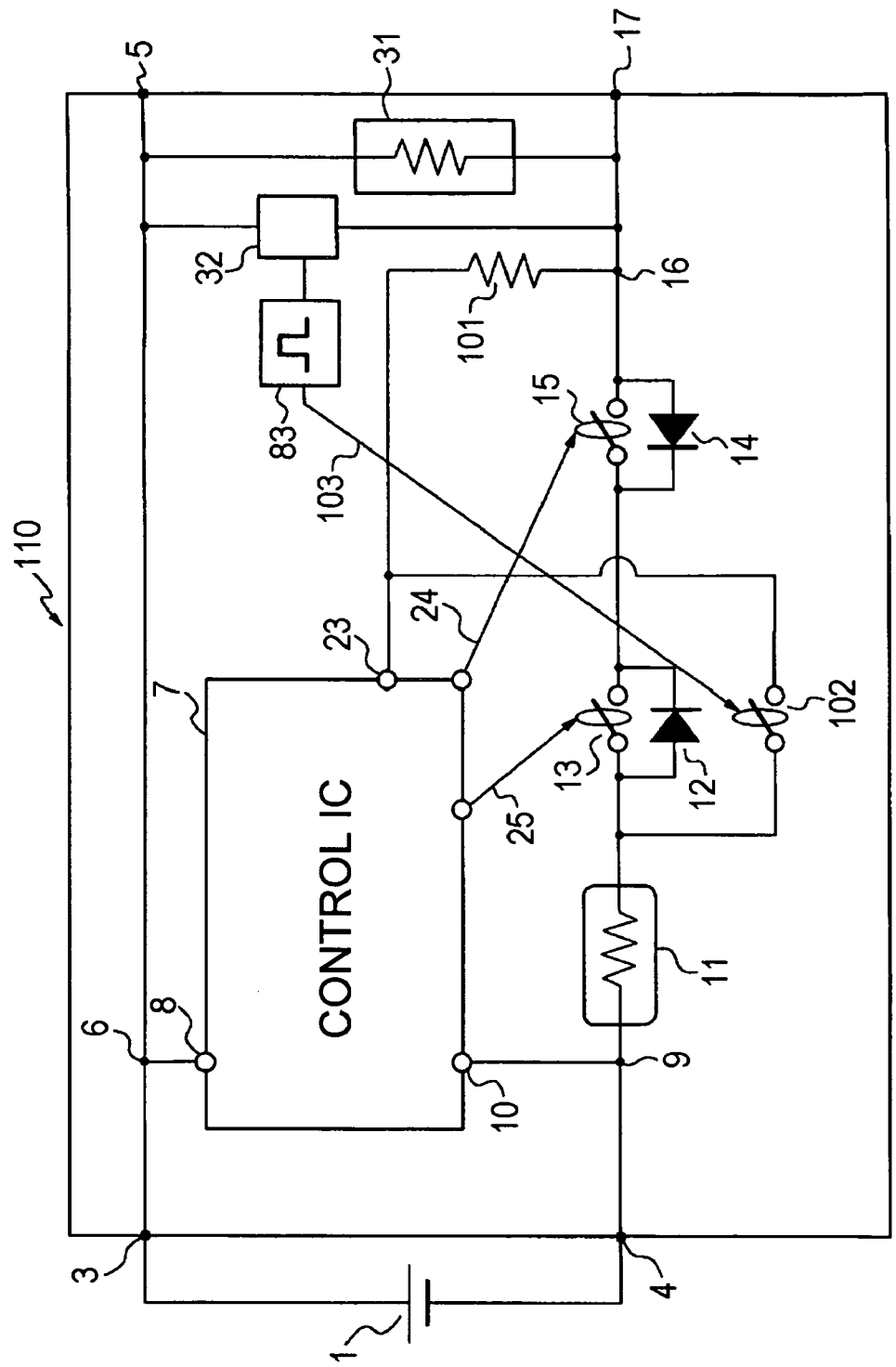
FIG. 9 is a simplified circuit schematic of an eighth embodiment of the battery pack protection circuit according to the present invention.

FIG. 9 is a simplified circuit schematic of an eighth embodiment of the battery pack protection circuit 110 according to the present invention. In the eighth embodiment, the detector 32 in the seventh embodiment outputs the overcurrent shut-off condition recovering switch connection signal 103 of the detector 32 to the overcurrent shut-off condition recovering switch 102 by way of the one-shot circuit 83. Since the other circuit construction is substantially the same as the first and the seventh embodiments, the same reference numerals as the first and the seventh embodiments are used for the corresponding elements in order to avoid duplicated detailed description.

In the eighth embodiment, since the overcurrent shut-off condition returning switch connection signal 103 of the detector 32 is outputted to the overcurrent shut-off condition returning switch 102 by way of the one-shot circuit 83, a predetermined voltage is applied between the external plus terminal 5 and the external minus terminal 17. In case when the detector 32 detects the voltage change or the like, the overcurrent shut-off condition returning switch connection signal 103 is outputted to the overcurrent shut-off condition returning switch 102 for only a first one time, thereby turning the overcurrent shut-off condition returning switch 102 into the ON (closed) condition and returning to the normal condition from the discharging shut-off condition.

Figure 10:
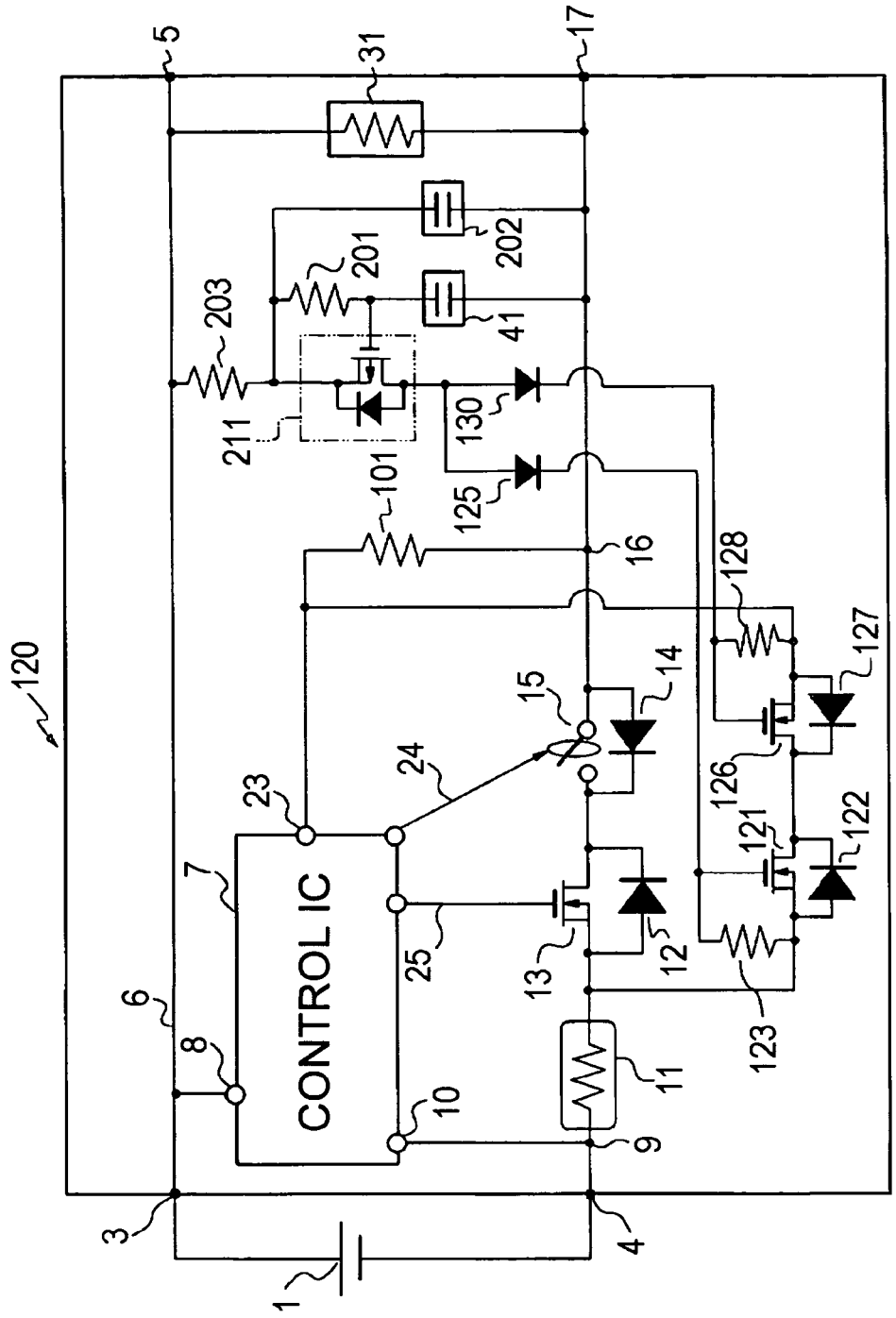
FIG. 10 is a simplified circuit schematic of a ninth embodiment of the battery pack protection circuit according to the present invention.

FIG. 10 is a simplified circuit schematic of a ninth embodiment of the battery pack protection circuit 120 according to the present invention. Since the ninth embodiment is substantially the same as the first embodiment, the same reference numerals as the first embodiment are used for the corresponding elements in order to avoid duplicated detailed description.

A field effect transistor is used as the discharging control switch 13. The source terminal of the discharging control switch 13 is connected to the source terminal of an overcurrent shut-off returning switch 121 which is also connected to the anode side of a diode 122. The drain terminal of the overcurrent shut-off returning switch 121 is connected to the cathode side of the diode 122. The diode 122 can be a discrete diode or a parasitic diode inside the field effect transistor defining the overcurrent shut-off returning switch 121.

A resistor 123 is connected in parallel between the gate and source terminals of the overcurrent shut-off returning switch 121 and the cathode side of a diode 125 is connected to the gate terminal of the overcurrent shut-off returning switch 121. The resistor 123 acts to hold the voltage between the gate and source terminals of the overcurrent shut-off returning switch 121 zero (0) volt in case when no voltage is applied from the diode 125.

Moreover, the drain terminal of an overcurrent shut-off returning switch 126 is connected to the drain terminal of the overcurrent shut-off returning switch 121. The drain terminal is connected to the cathode side of a diode 127 and the source terminal of the overcurrent shut-off returning switch 126 is connected to the anode side of the diode 127. The diode can be a discrete diode or a parasitic diode inside the field effect transistor defining the overcurrent shut-off returning switch 126.

A resistor 128 is connected in parallel between the gate and source terminals of the overcurrent shut-off returning switch 126 and the gate terminal of the overcurrent shut-off returning switch 126 is connected to the cathode side of a diode 130. The resistor 128 acts to hold the voltage between the gate and source terminals of the overcurrent shut-off returning switch 126 zero (0) volt in case no voltage is applied from the diode 130.

The anode side of the diode 125 and the anode side of the diode 130 are connected together and then connected to the drain terminal of a field effect transistor defining a part of an overcurrent shut-off releasing switch 211.

The diodes 125 and 130 are employed so that the voltage on the gate terminal of the overcurrent shut-off returning switch 126 is not applied to the gate terminal of the overcurrent shut-off returning switch 121.

If the diodes 125 and 130 are eliminated, in the overcurrent shut-off condition, the gate voltage of the n-channel field effect transistor defining the overcurrent shut-off returning switch 121 is always approximately 2 volts or higher and thus always maintaining the overcurrent shut-off returning switch 121 in the ON condition.

In case when a predetermined voltage is applied between the external plus terminal 5 and the external minus terminal 17, the voltage is transferred to the gate terminal of the overcurrent shut-off releasing switch 211 by way of the differentiation circuit 41 only for a given initial time, thereby switching the voltage between the source terminal and the gate terminal of the p-channel field effect transistor defining the overcurrent shut-off releasing switch 211 from approximately zero (0) volt to approximately −2 volts. This connects between the source terminal and the drain terminal of the field effect transistor defining the overcurrent shut-off releasing switch 211 and thus the voltage on the external plus terminal 5 is applied to the anode side of the diode 125 and the anode side of the diode 130.

At this side, the overcurrent shut-off releasing switch 211 is turned on for a first given time by the differentiation circuit 41 and the voltage is applied to both diodes 125 and 130. As a result, the overcurrent shut-off returning switches 121 and 126 are turned ON (closed) for switching the voltage between the battery minus terminal and the overcurrent voltage detection terminal (or voltage supply terminal) 23 to zero (0) volt. The control IC 7 measures the approximately zero (0) volt between the battery minus terminal and the overcurrent voltage detection terminal (or voltage supply terminal) 23 for switching the condition of the control IC 7 from the overcurrent shut-off condition to the normal condition, i.e., the condition when charging and discharging can be made freely. The discharging control switch 13 and the charging control switch 15 are turned on, thereby returning to the normal condition from the condition when charging is shut off.

Figure 11:
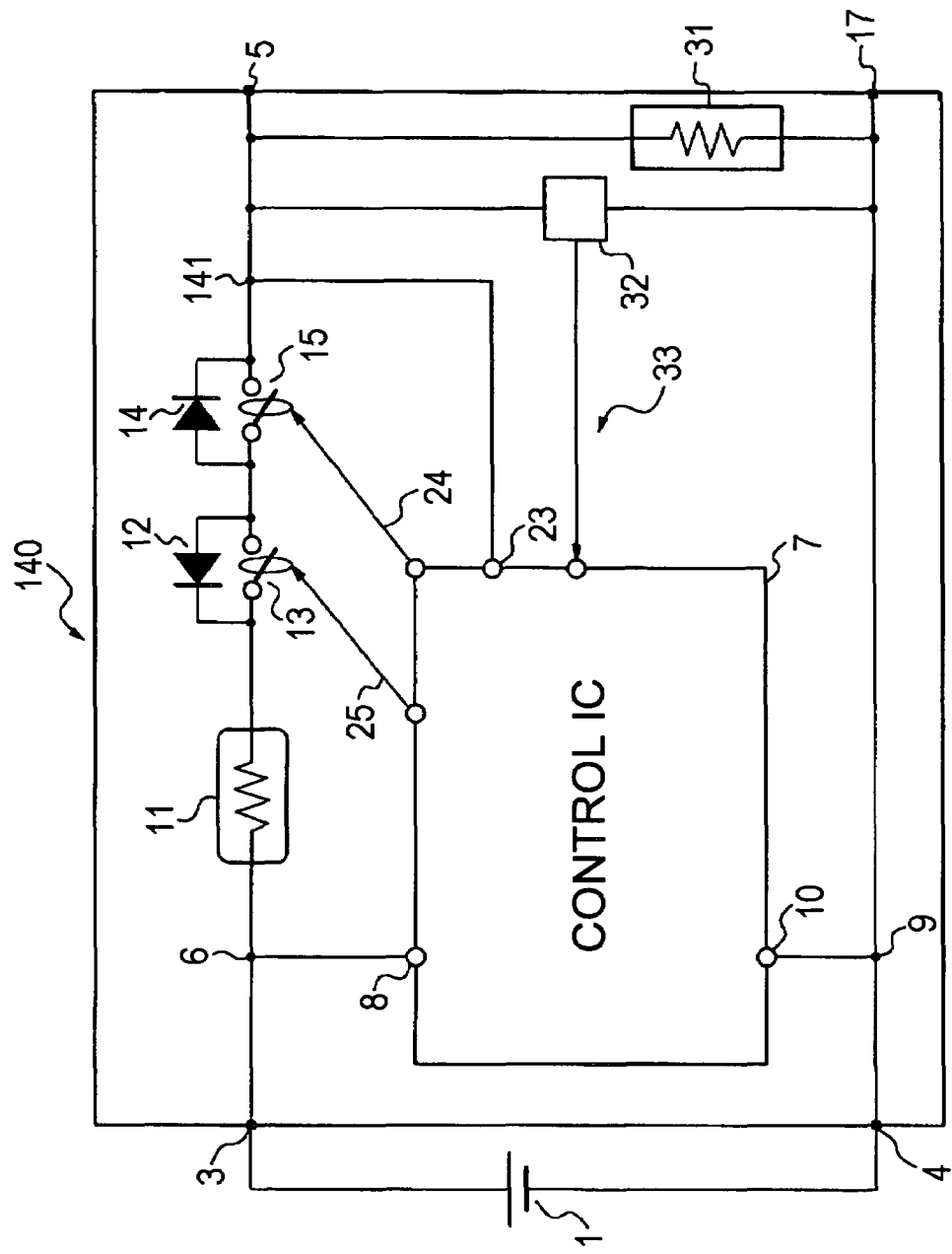
FIG. 11 is a simplified circuit schematic of a tenth embodiment of the battery pack protection circuit according to the present invention.

FIG. 11 is a simplified circuit schematic of a tenth embodiment of the battery pack protection circuit 140 according to the present invention. Since the tenth embodiment is substantially the same as the first embodiment, the same reference numerals as the first embodiment are used for the corresponding elements in order to avoid duplicated detailed description.

In the tenth embodiment, a resistor 11, a discharging control switch 13 and charging control switch 15 are connected in series between the external plus terminal 5 and a junction 6. Diodes 12 and 14 are connected in parallel with the discharging control switch 13 and the charging control switch 15, respectively. Connection directions of the diodes 12 and 14 are opposite to each other in the direction of flowing current therethrough. The diode 12 can be a discrete diode or a parasitic diode inside the field effect transistor defining the discharging control switch 13. Similarly, the diode 14 can be a discrete diode or a parasitic diode inside the field effect transistor defining the charging control switch 15.

Moreover, the external plus terminal 5 is connected to the overcurrent voltage detection terminal 23 by way of a junction 131. Such circuit arrangement of the discharging control switch 13 and the charging control switch 15 may be provided not only at the external minus terminal 17 side but also at the external plus terminal 5 side.

Figure 12:
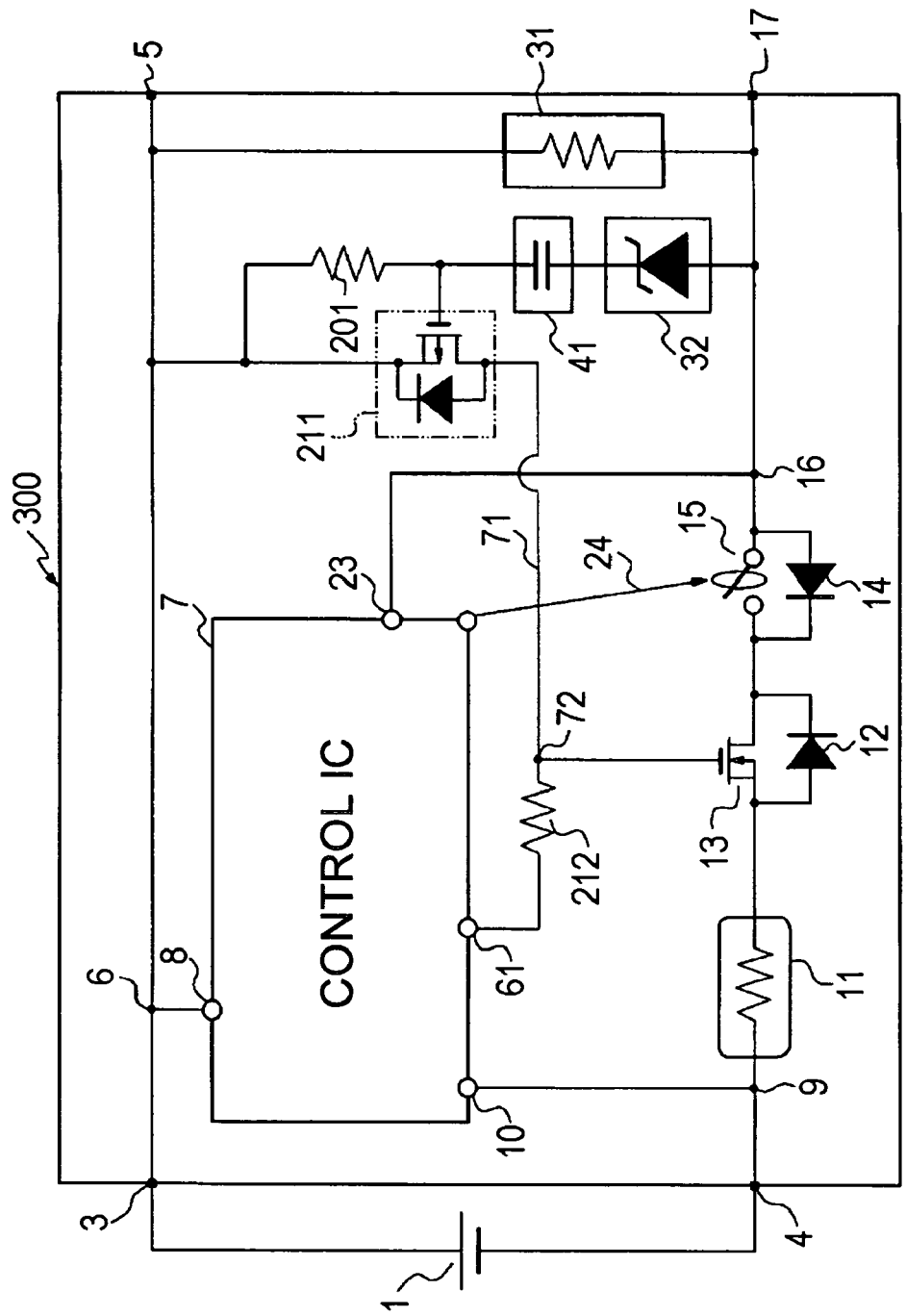
FIG. 12 is a simplified circuit schematic of an eleventh embodiment of the battery pack protection circuit according to the present invention.

FIG. 12 is a simplified circuit schematic of an eleventh embodiment of the battery pack protection circuit 300 according to the present invention. In the eleventh embodiment, the reverse current protector (diode) 62 in the fifth embodiment is replaced by a resistor 212 and the resistor 63 is eliminated. Since the other construction is substantially the same as the first embodiment and the fifth embodiment, the same reference numerals as the first and fifth embodiments are used for the corresponding elements in order to avoid duplicated detailed description.

In the battery pack protection circuit of the fifth embodiment as shown in FIG. 6, since the discharging switch connection signal 61 from the control IC 7 is connected to the gate terminal of the field effect transistor defining the discharging control switch 13 by way of the diode 62, no current flows from the cathode to the anode of the diode 62, thereby making it impossible to eliminate the resistor 63. On the other hand, since the discharging switch connection signal 61 from the control IC 7 is connected to the gate terminal of the field effect transistor defining the discharging control switch 13 by way of the resistor 212 in the eleventh embodiment, the resistor 63 can be eliminated because the gate terminal voltage of the discharging control switch 13 is zero (0) volt when the discharging switch connection signal 61 is approximately zero (0) volt.

Figure 13:
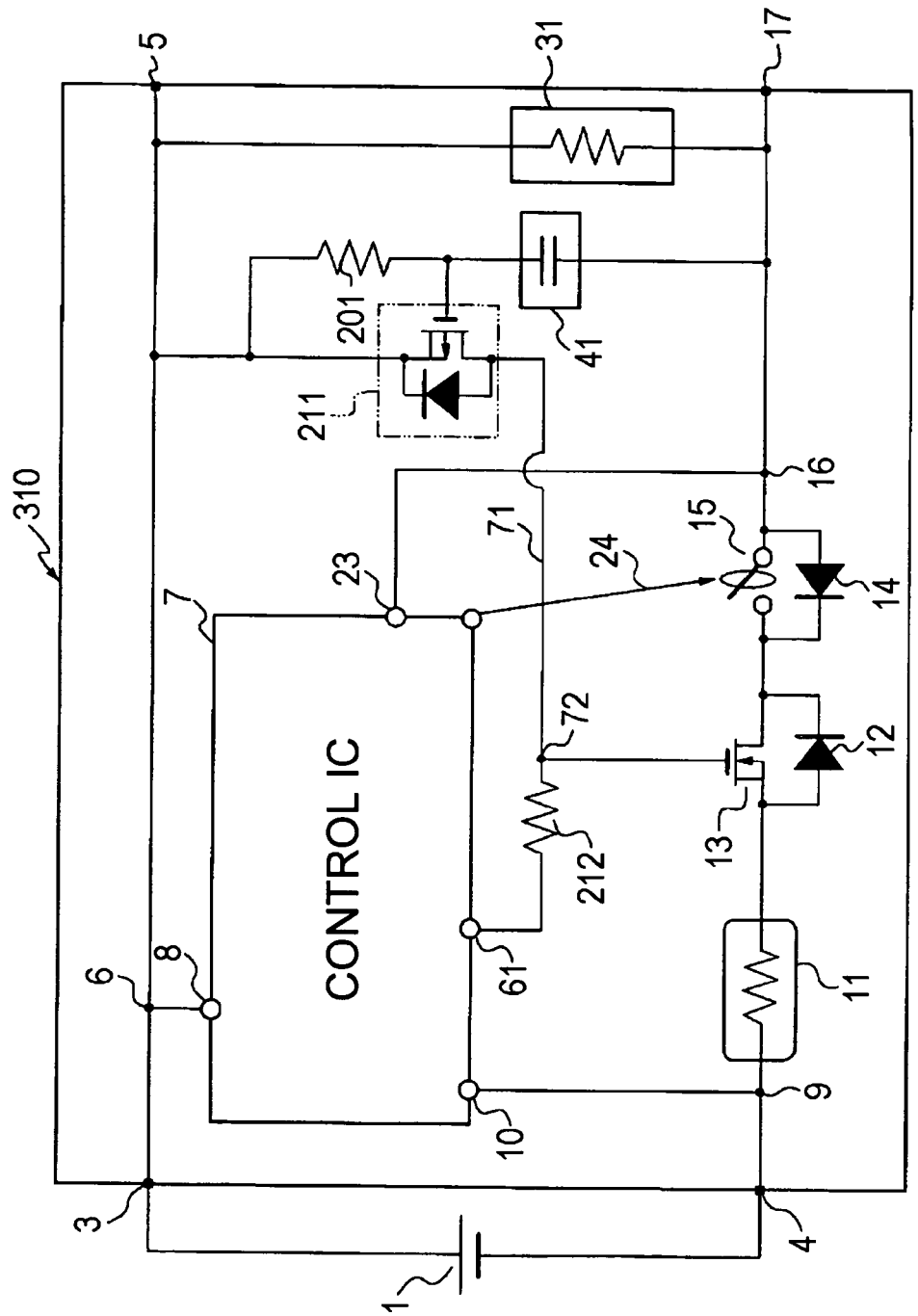
FIG. 13 is a simplified circuit schematic of a twelfth embodiment of the battery pack protection circuit according to the present invention.

FIG. 13 is a simplified circuit schematic of a twelfth embodiment of the battery pack protection circuit 310 according to the present invention. In the twelfth embodiment, the detector 32 in the eleventh embodiment is eliminated. Since the other construction is substantially the same as the first and the eleventh embodiments, the same reference numerals as the first and the eleventh embodiments are used for the corresponding elements in order to avoid duplicated detailed description.

In the twelfth embodiment, a description is made assuming that the switch 15 has a function to make the overcurrent shut-off condition in the ON condition when the control IC 7 is in the overcurrent shut-off condition.

When voltage is applied between the external minus terminal 17 and the external plus terminal 5 by connecting, for example, a charger or the like (not shown), voltage is applied to the gate terminal of the overcurrent shut-off releasing switch 211 for a first given time by way of the differentiation circuit (capacitor) 41. The voltage between the source terminal and the gate terminal of the p-channel field effect transistor defining the overcurrent shut-off switch 211 becomes approximately −2 volts or lower. The overcurrent shut-off releasing switch 211 is then switched to the ON condition to apply the voltage on the external plus terminal 5 to the gate terminal of the discharging control switch 13, thereby turning on the discharging control switch 13.

As a result, the battery minus terminal 4 and the external minus terminal 17 are connected together for making the voltage between the negative side power supply terminal 10 of the control IC 7 and the overcurrent voltage detection terminal (or voltage supply terminal) 23 approximately zero (0) volt to return the control IC 7 to the normal condition.

After a lapse of a first given time since applying voltage between the external minus terminal 17 and the external plus terminal 5, the overcurrent shut-off releasing switch 211 becomes the OFF condition. Since the discharging switch connection signal 61 is +2 volts or higher, the discharging control switch 13 remains in the ON condition.

Figure 14:
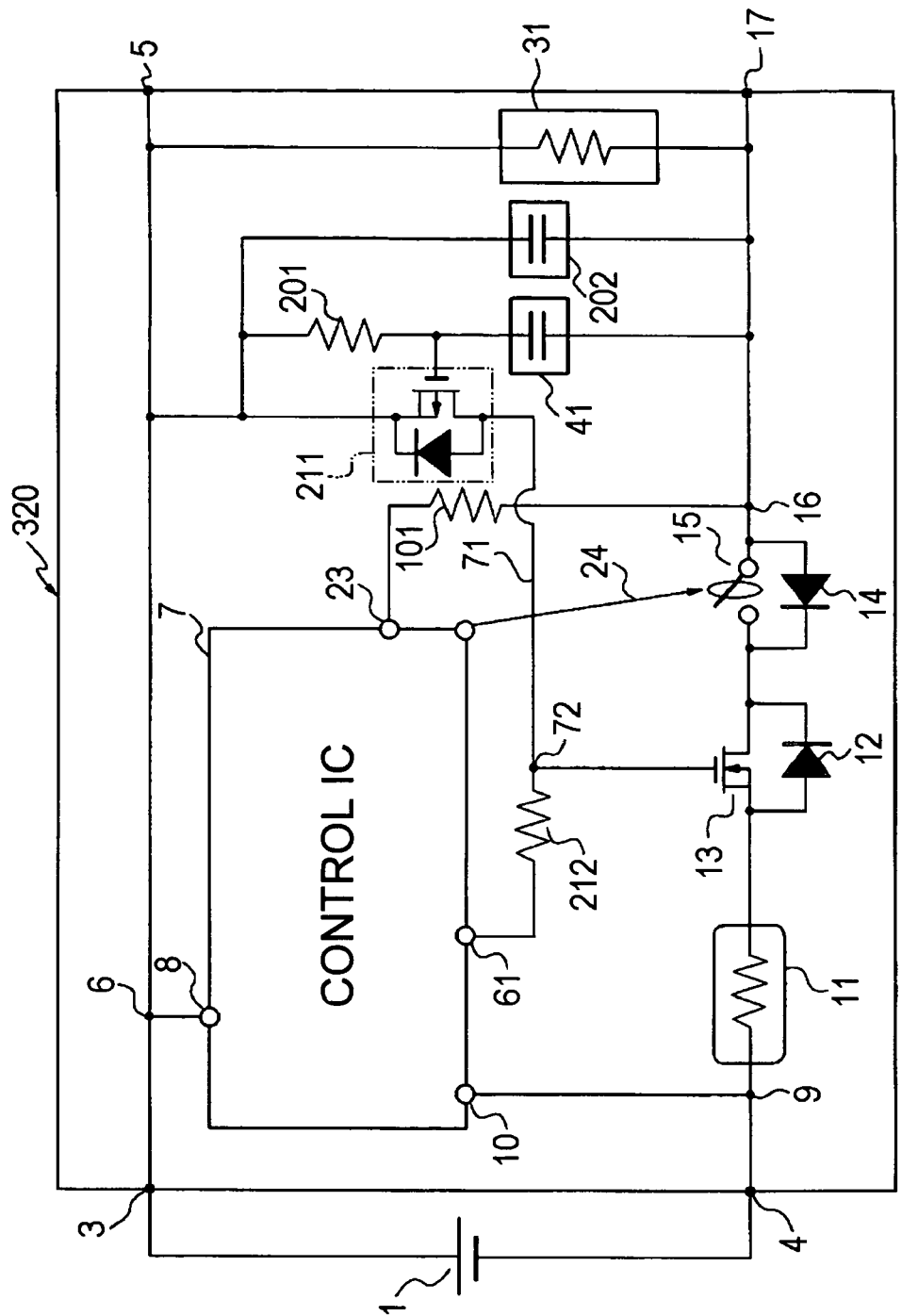
FIG. 14 is a simplified circuit schematic of a thirteenth embodiment of the battery pack protection circuit according to the present invention.

FIG. 14 is a simplified circuit schematic of a thirteenth embodiment of the battery pack protection circuit 320 according to the present invention. In the thirteenth embodiment, a voltage smoother (capacitor) 202 is added to the twelfth embodiment. Since the other construction is the same as the first and the twelfth embodiments, the same reference numerals as the first and the twelfth embodiments are used for the corresponding elements in order to avoid duplicated detailed description.

In the thirteenth embodiment, the voltage smoother (capacitor) 202 is connected in parallel with the differentiation circuit (capacitor) 41 and the resistor 201. Since a resistor 101 is connected between the overcurrent voltage detection terminal (or voltage supply terminal) 23 of the control IC 7 and the external minus terminal 17, the voltage smoother (capacitor) 202 is connected between the external minus terminal 17 and the external plus terminal 5.

Now, in case of the overcurrent shut-off condition, a description will be made assuming that the control IC 7 has a function to connect between the negative side power supply terminal 10 and the overcurrent voltage detection terminal (or voltage supply terminal) 23 with a resistor of approximately 500 kΩ (many actual control ICs 7 for secondary battery have such function).

The resistor 101 and the voltage smoother (capacitor) 202 operate not to switch the overcurrent shut-off releasing switch 211 into the ON condition when it is released from connecting between the external minus terminal 17 and the external plus terminal 5 with a resistor having abnormally low resistance, for example, a chain or the like, i.e., the shorted condition.

In other words, when the external minus terminal 17 and the external plus terminal 5 are released to an open condition from the condition which is connected with a resistor having abnormally low resistance, an operation of the resistor 101 and the voltage smoother (capacitor) 202 allows the voltage between the external minus terminal 17 and the external positive terminal 5 to rise gradually and also the voltage of the differentiation circuit (capacitor) 41 to rise gradually. Subsequently, after a lapse of a given time, the voltage of the differentiation circuit (capacitor) 41 becomes substantially equal to the voltage between the external minus terminal 17 and the external plus terminal 5.

As a result, a very small current starts to flow through the resistor 101, thereby maintaining the voltage across the resistor 101 approximately zero (0) volt. Then, the voltage between the source terminal and the gate terminal of the p-channel field effect transistor defining a part of the overcurrent shut-off releasing switch 211 remains approximately zero (0) volt, thereby making the overcurrent shut-off releasing switch 211 not to switch to the ON condition.

Accordingly, studying the case when, for example, the voltage smoother (capacitor) 202 is not connected, when a resistor having abnormally low resistance is repeatedly connected between the battery pack external terminals, a large current flows through the differentiation circuit 41 and the resistor 101 at the instance when the resistor is disconnected, thereby developing a large voltage across the resistor 101 to switch the overcurrent shut-off releasing switch 211 into a conduction state and disabling to maintain the open condition of the overcurrent shut-off releasing switch 211.

In other words, for example, in case when a metal chain is repetitively connected between the battery pack external terminals, the battery pack repetitively discharges and abnormal heat is developed in the metal chain.

It is preferable that the resistance of the resistor 101 is in the range of approximately 1 kΩ to 200 kΩ and the capacitance of the voltage smoother (capacitor) 202 is in the range of approximately 0.22 μF to approximately 100 μF.

Preferably, the resistance of the resistor 201 is in the range of approximately 10 kΩ to 2 MΩ and the capacitance of the differentiation circuit (capacitor) 41 is in the range of approximately 0.002 μF to approximately 10 μF.

In this case, experiment results show that the product (time constant A) of the resistance of the resistor 101 (referred to as R101 below) and the capacitance of the voltage smoother (capacitor) 202 (referred to as C202 below) is preferably equal to or larger than the product (time constant B) of the resistance of the resistor 201 (referred to as R201 below), the capacitance of the differentiation circuit (capacitor) 41 (referred to as C41 below) and a constant 0.3. That is, it is preferable to satisfy the following Expression (1).

$$R101 \times C202 > R201 \times C41 \times 0.3 \tag{1}$$

Figure 29:
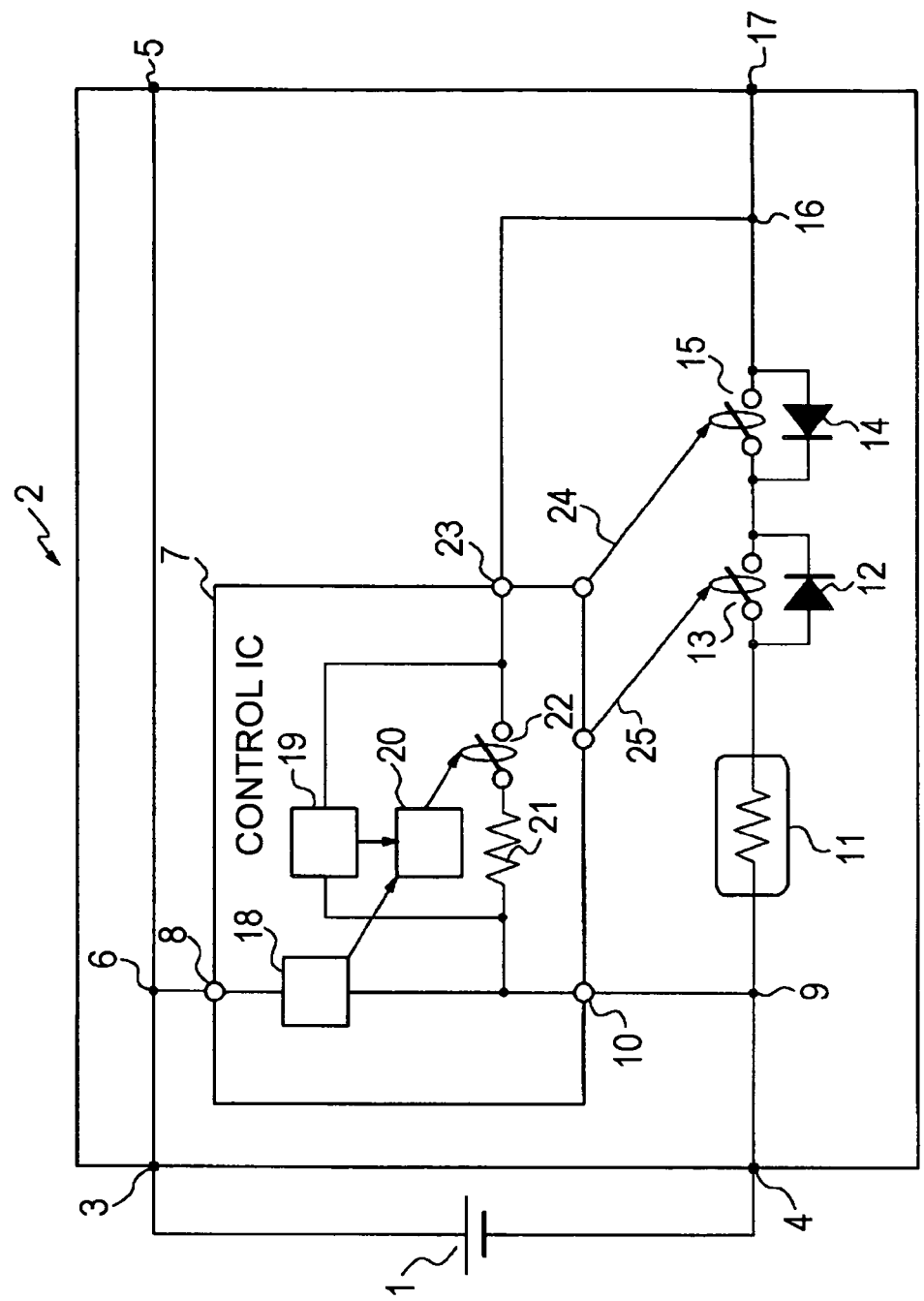
FIG. 29 is a simplified circuit schematic of a conventional battery pack protection circuit.
Figure 30:
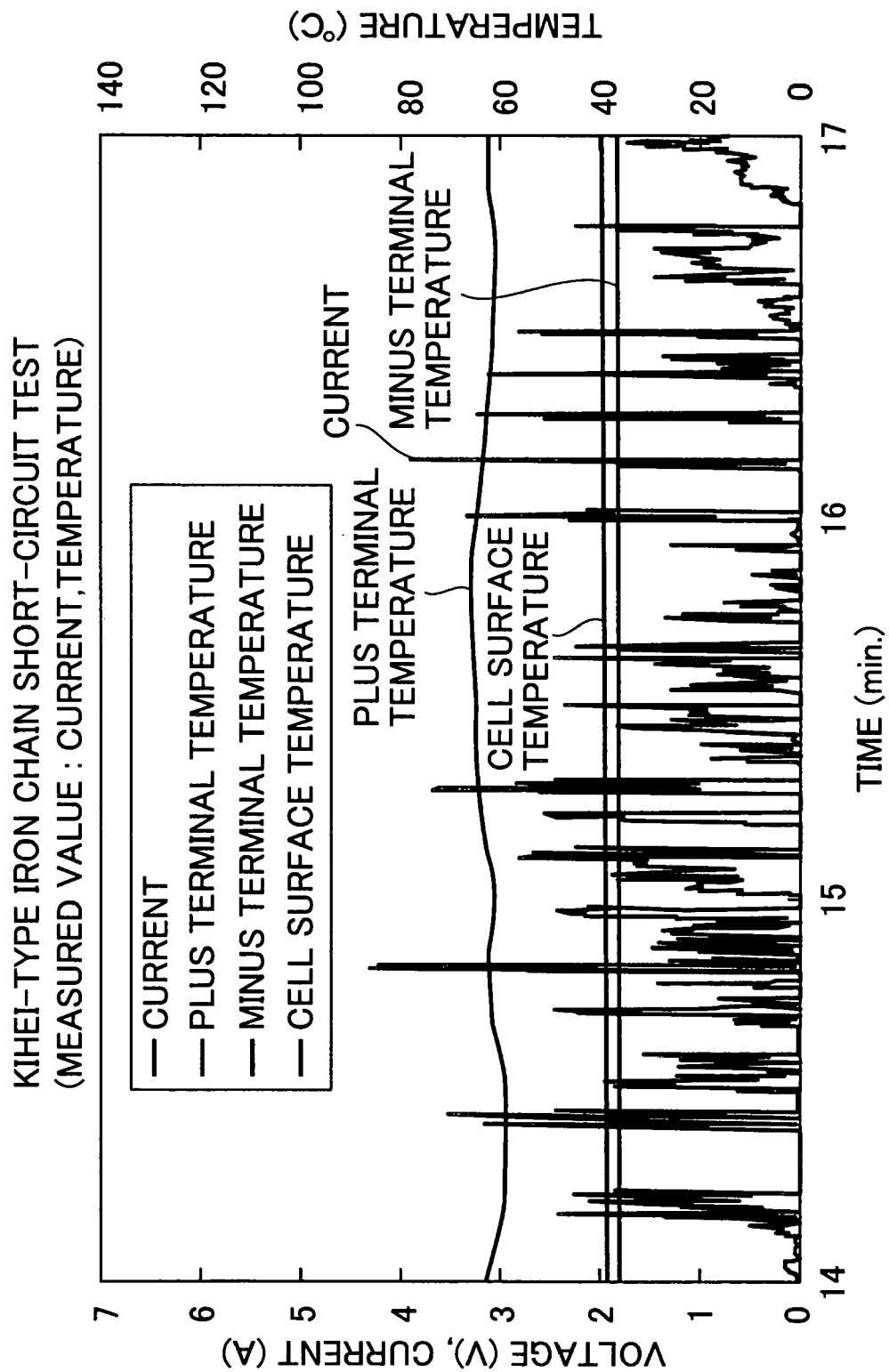
FIG. 30 is a graph for showing the amplitude of the discharge current, surface temperature of the external plus terminal (positive terminal temperature), surface temperature of the external negative terminal (negative terminal temperature) and surface temperature of the battery pack (cell surface temperature) in the test of connecting a Kihei-type iron chain between the external terminals of the conventional battery pack.

Under the overcurrent shut-off condition, in case when the resistance (refereed to as R21 below) of the resistor inside the control IC 7 (corresponding to the resistor 21 in FIG. 29) for connecting between the negative side power supply terminal 10 and the overcurrent voltage detection terminal (or voltage supply terminal) 23 of the control IC 7, it is preferable to take the resistance R21 of the resistor 21 into consideration. In this case, it is preferable that the product (time constant A) of the sum of the resistance R101 and the resistance R21 of the resistor 21 and the capacitance of the voltage smoother (capacitor) 202 (C202) is equal to or larger than the product (time constant B) of the resistance R201 of the resistor 201, the capacitance of the differentiation circuit (capacitor) 41 C41 and a constant 0.8. That is, it is preferable to satisfy the following Expression (2).

$$(R101+R21) \times C202 \geq R201 \times C41 \times 0.8 \qquad (2)$$

Figure 15:
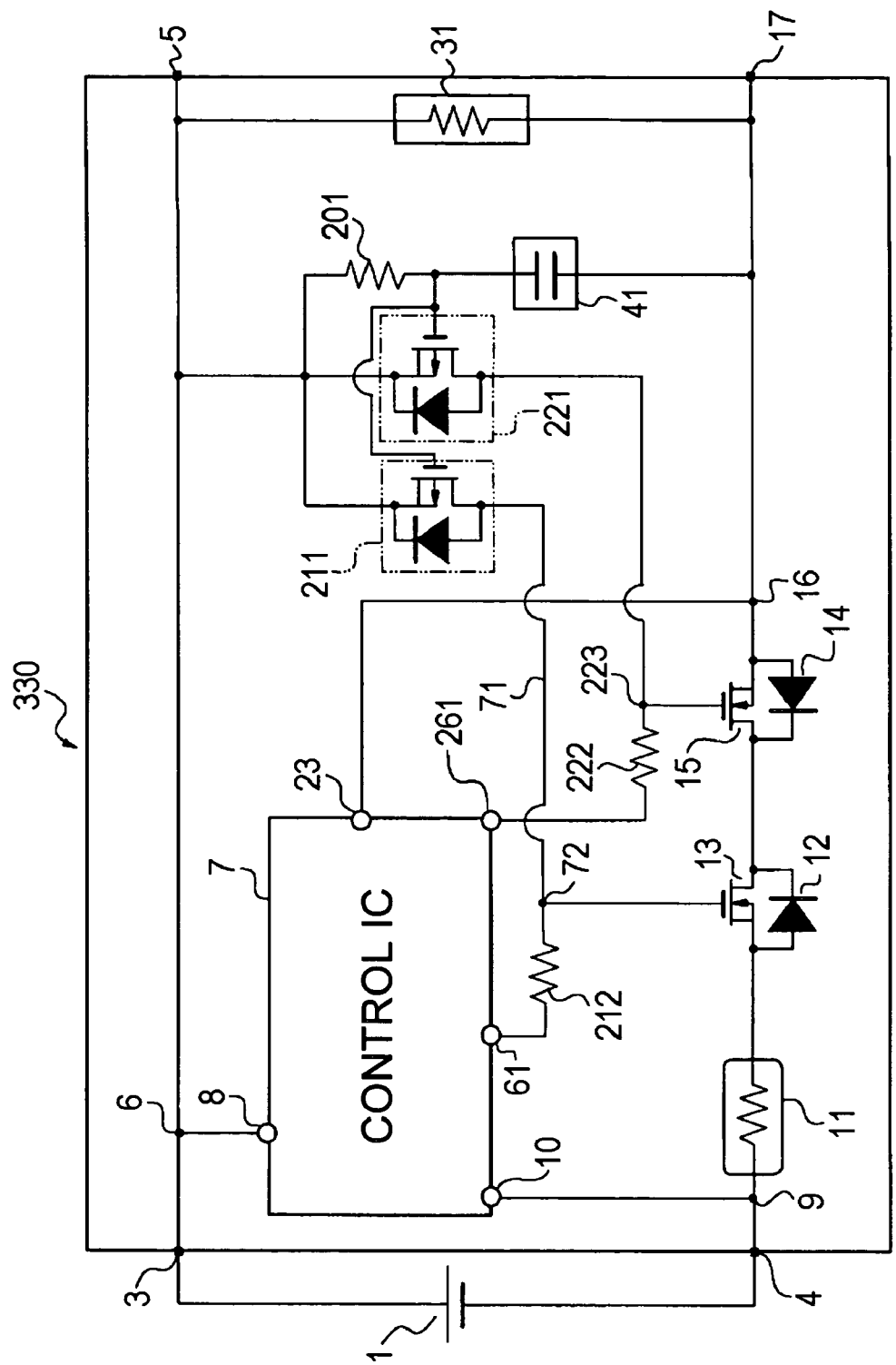
FIG. 15 is a simplified circuit schematic of a fourteenth embodiment of the battery pack protection circuit according to the present invention.

FIG. 15 is a simplified circuit schematic of a fourteenth embodiment of the battery pack protection circuit 330 according to the present invention. In the fourteenth embodiment, an overcurrent shut-off releasing switch 221 and a resistor 222 are added to the twelfth embodiment. Since the other construction is the same as the first and the twelfth embodiments, the same reference numerals as the first and the twelfth embodiments are used for the corresponding elements in order to avoid duplicated detailed description.

In the fourteenth embodiment, similar to the overcurrent shut-off releasing switch 211, an overcurrent shut-off releasing switch 221 is connected between the differentiation circuit 41 and the resistor 201.

Similar to the overcurrent shut-off releasing switch 211, it is also possible that the overcurrent shut-off releasing switch 221 uses the circuit configuration to connect, for example, the source terminal of the field effect transistor and the cathode of the diode and also to connect the drain terminal of the field effect transistor and the anode of the diode.

As shown in FIG. 15, the gate terminal of the field effect transistor defining a part of the overcurrent shut-off releasing switch 221 is connected to the junction of the differentiation circuit 41 and the resistor 201. The source terminal of the field effect transistor and the cathode of a diode are connected to the external plus terminal 5 while the drain terminal of the field effect transistor and the anode of the diode are connected to the charging control switch 15 by way of the charging switch signal junction 223. In other words, the overcurrent shut-off releasing switches 211 and 221 are connected in the same way to each other except the connection of the drain terminal of the field effect transistor and the anode of the diode. Moreover, the charging switch signal junction 223 is connected to a charging control terminal 261 of the control IC 7 by way of a resistor 222.

Now, description will be made assuming that the control IC 7 has a function to hold the voltage on the charging control terminal 261 approximately zero (0) volt in the overcurrent shut-off condition (actually, many control ICs 7 for secondary battery have such function).

When a voltage is applied between the external minus terminal 17 and the external plus terminal 5, for example, by connecting a charger, the voltage on the external minus terminal 17 is applied to the overcurrent shut-off releasing switches 211 and 221 as the gate voltage thereof for the first given time by way of the differentiation circuit (capacitor) 41. Since the voltage between the source and gate terminals of the p-channel field effect transistors defining the overcurrent shut-off releasing switches 211 and 221 is equal to or lower than approximately -2 volts, the overcurrent shut-off releasing switches 211 and 221 switch to the ON condition. Then, the voltage applied to the external plus terminal 5 is applied to the gate terminals of the charging control switch 13 and the discharging control switch 15, thereby switching the discharging control switch 13 and the charging control switch 15 to the ON condition.

As a result, the battery minus terminal 4 and the external minus terminal 17 are connected together. The voltage between the negative side power supply terminal 10 of the control IC 7 and the overcurrent voltage detection terminal (or voltage supply terminal) 23 becomes approximately zero (0) volt, thereby allowing the control IC 7 to return to the normal condition.

Figure 16:
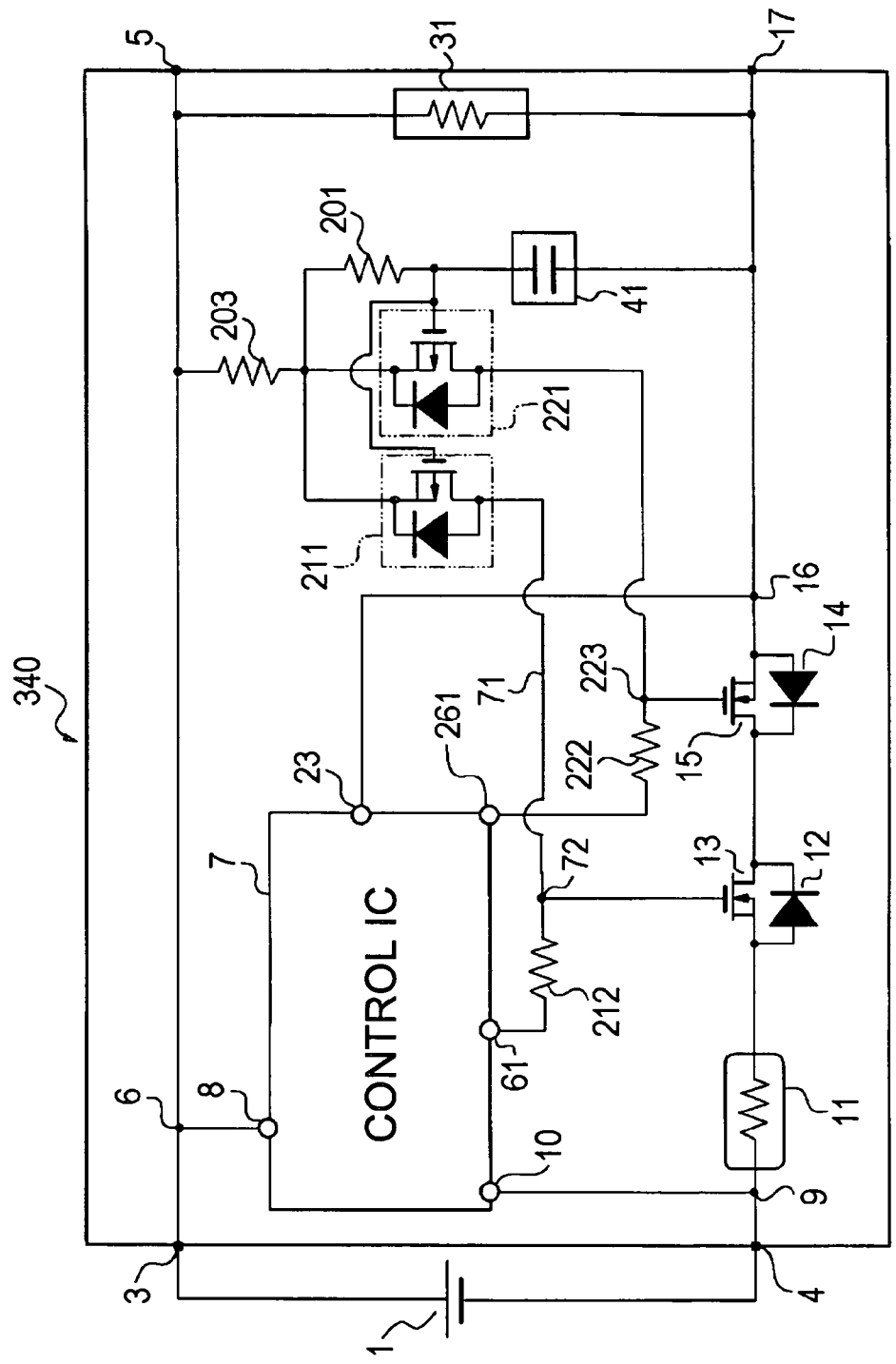
FIG. 16 is a simplified circuit schematic of a fifteenth embodiment of the battery pack protection circuit according to the present invention.

FIG. 16 is a simplified circuit schematic of a fifteenth embodiment of the battery pack protection circuit. 340 according to the present invention. In the fifteenth embodiment, a resistor 203 is added to the fourteenth embodiment. Since the other construction is the same as the first and the fourteenth embodiments, the same reference numerals as the first and the fourteenth embodiments are used for the corresponding elements in order to avoid duplicated detailed description.

In the fifteenth embodiment, the overcurrent shut-off releasing switches 211 and 221 and the resistor 201 are connected to the external plus terminal 5 by way of the resistor 203. Accordingly, by connecting the resistor 203 between the overcurrent shut-off releasing switches 211, 221 and the external plus terminal 5, even if, for example, incidental electro static voltage or the like may be applied between the external plus terminal 5 and the external minus terminal 17, the overcurrent shut-off releasing switches 211 and 221 are protected from break-down due to application of electrostatic voltage or the like.

Figure 17:
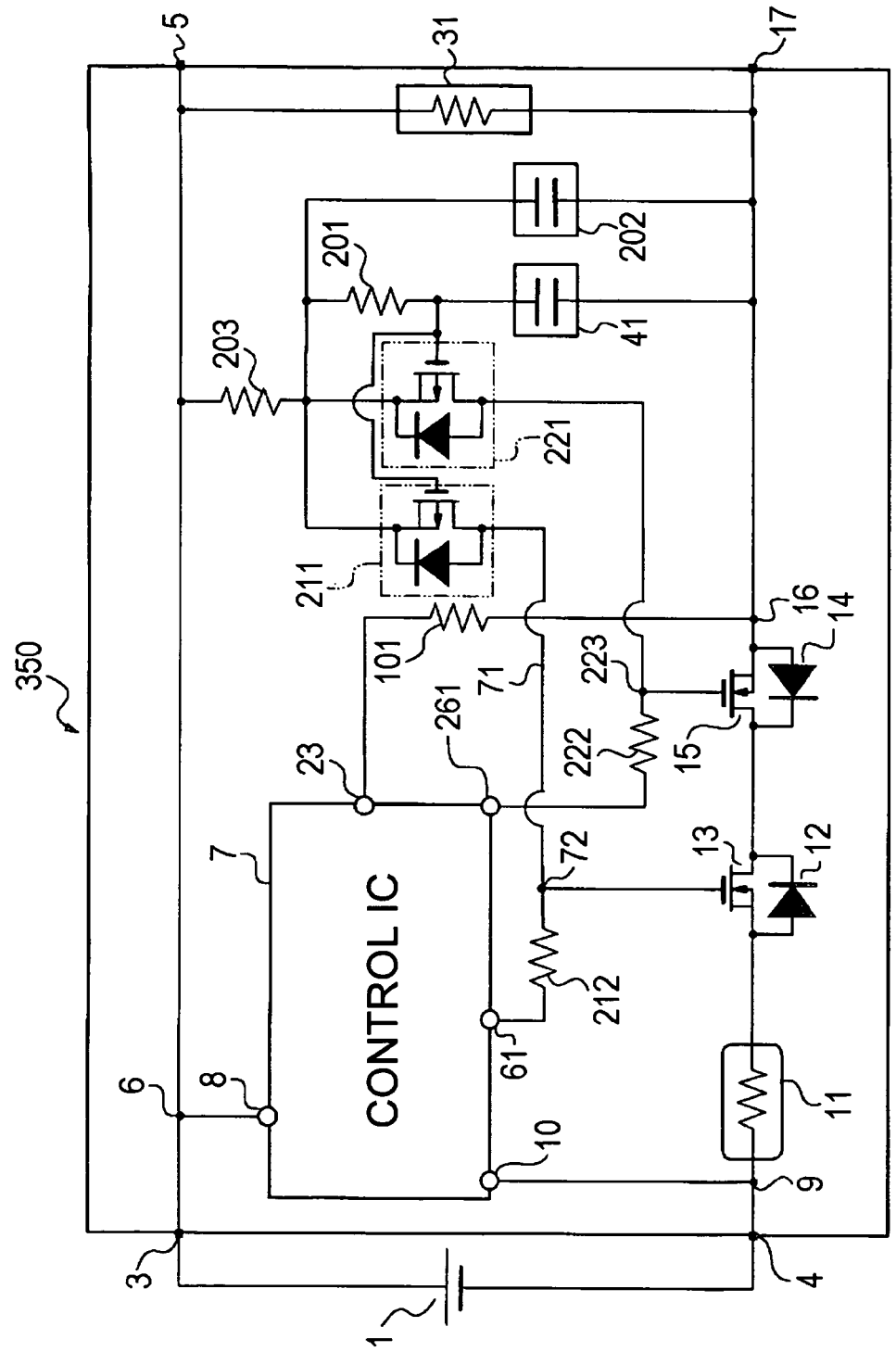
FIG. 17 is a simplified circuit schematic of a sixteenth embodiment of the battery pack protection circuit according to the present invention.

FIG. 17 is a simplified circuit schematic of a sixteenth embodiment of the battery pack protection circuit 350 according to the present invention. The sixteenth embodiment is a combination of the thirteenth and the fifteenth embodiments. Since the other construction is the same as the first embodiment, the same reference numerals as the first embodiment are used for the corresponding elements in order to avoid duplicated detailed description.

In the sixteenth embodiment, if it is switched to the open condition from the condition when a resistor such as, for example, a chain or the like having an abnormally low resistance is connected between the external minus terminal 17 and the external plus terminal 5 (i.e., the shorted condition), the resistor and the voltage smoother (capacitor) 202 operate so that the overcurrent shut-off releasing switches 211 and 221 are prohibited to switch to the ON condition.

In other words, since it can achieve the same circuit operation as the first and the fifteenth embodiments, it is one of the optimum circuit configurations, for example, in applying to actual products. In summary, the battery pack according to the present invention can be implemented by appropriately combining some of the abovementioned embodiments.

Figure 18:
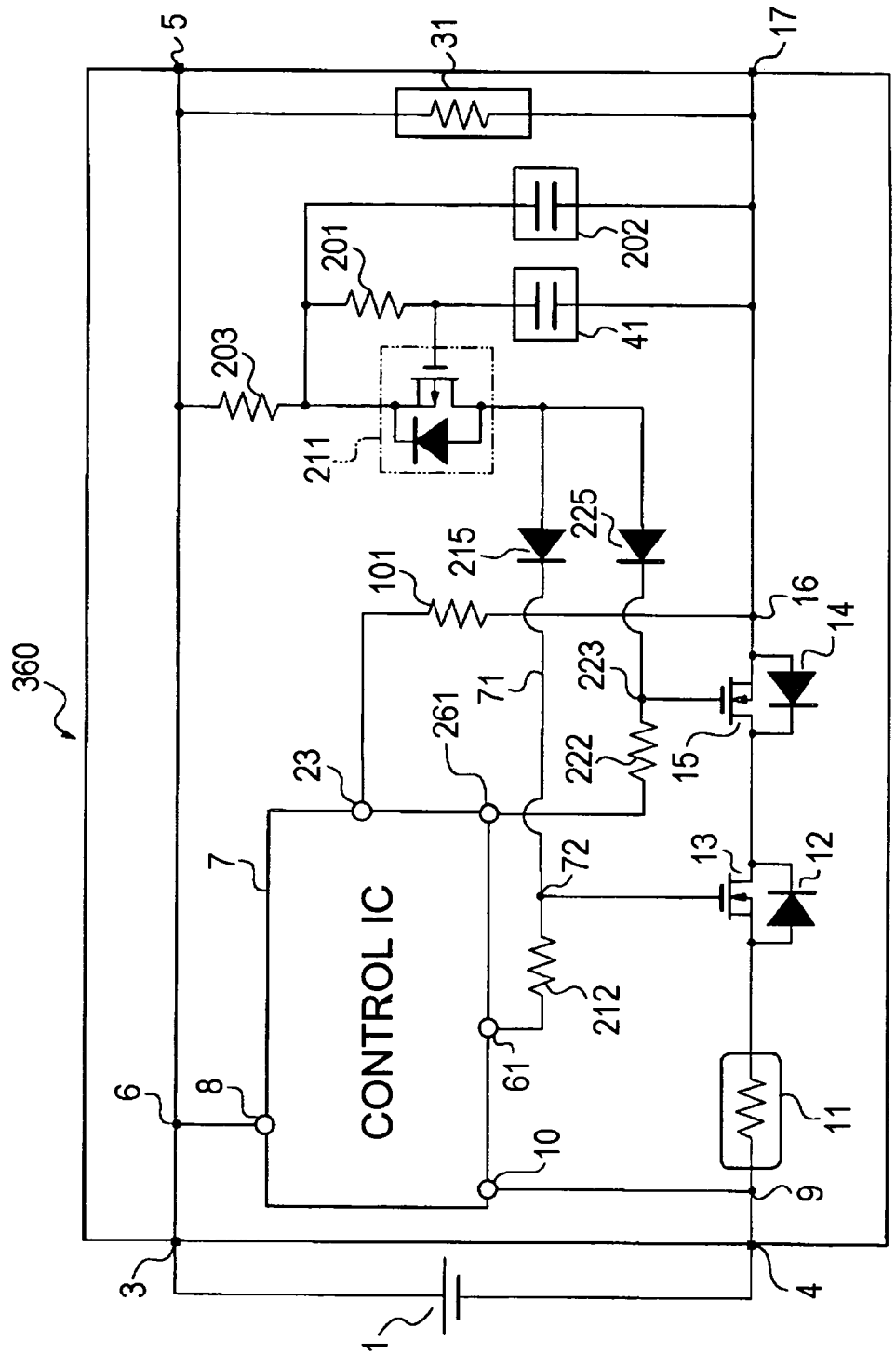
FIG. 18 is a simplified circuit schematic of a seventeenth embodiment of the battery pack protection circuit according to the present invention.

FIG. 18 is a simplified circuit schematic of a seventeenth embodiment of the battery pack protection circuit 360 according to the present invention. In the seventeenth embodiment, the overcurrent shut-down recovering switch 221 in the sixteenth embodiment is eliminated and diodes 215, 225 are added. Since the other construction is the same as the first and the sixteenth embodiments, the same reference numerals as the first and the sixteenth embodiments are used for the corresponding elements in order to avoid duplicated detailed description.

In the seventeenth embodiment, the drain terminal of the p-channel field effect transistor defining the overcurrent shut-off recovering switch 211 and the anode of a diode are connected to the anodes of the diodes 215, 225 with the cathode of the diode 215 being connected to the discharging switch signal junction 72 and the cathode of the diode 225 being connected to the charging switch signal junction 223.

That is, the overcurrent shut-off releasing switch 211 is connected to the discharging switch signal junction 72 by way of the diode 215 and connected to the charging switch signal junction 223 by way of the diode 225. The diodes 215, 225 are used so that the voltage on the gate terminal of the charging control switch 15 is not applied to the gate terminal of the discharging control switch 13.

Accordingly, when voltage is applied to between the external minus terminal 17 and the external plus terminal 5, the overcurrent shut-off releasing switch 211 is switched on only for a first given time. The voltage on the external plus terminal 5 is applied to the gate terminal of the discharging control switch 13 by way of the diode 215 for switching on the discharging control switch 13 and also applied to the gate terminal of the charging control switch 15 by way of the diode 225 for switching on the charging control switch 15.

As a result, the battery minus terminal 4 and the external minus terminal 17 are connected together to make the voltage between the negative side of the power supply terminal 10 of the control IC 7 and the overcurrent voltage detection terminal (or voltage supply terminal) 23 approximately zero (0) volt, thereby recovering the control IC 7 to the normal condition.

Figure 19:
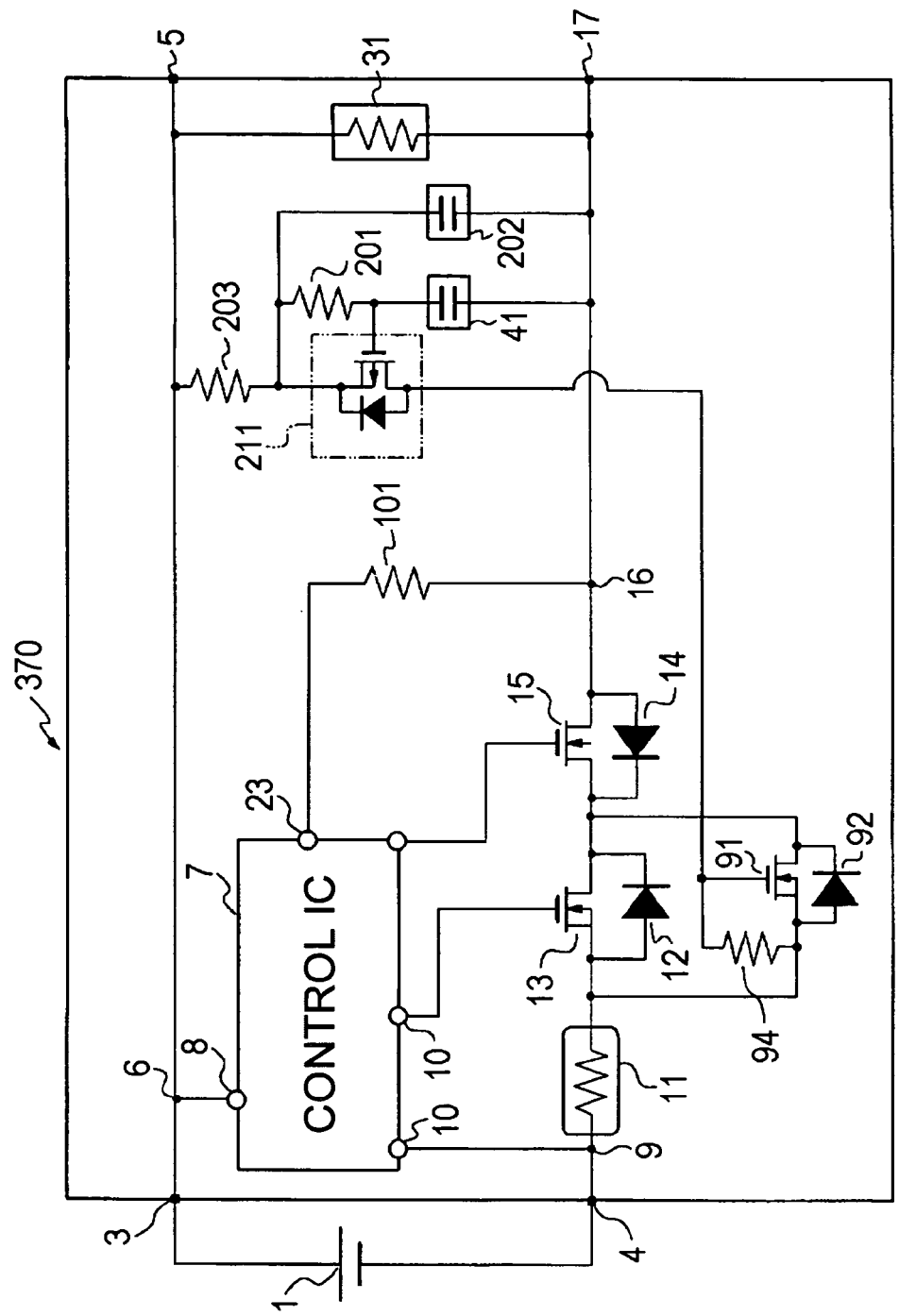
FIG. 19 is a simplified circuit schematic of an eighteenth embodiment of the battery pack protection circuit according to the present invention.

FIG. 19 is a simplified circuit schematic of an eighteenth embodiment of the battery pack protection circuit 370 according to the present invention. In the eighteenth embodiment, the overcurrent shut-off releasing switch 221 and the resistors 212, 222 in the sixteenth embodiment are eliminated and a discharging control switch 91, a diode 92 and a resistor 94 are added. Since the other construction is the same as the first and the sixteenth embodiments, the same reference numerals as the first and the sixteenth embodiments are used for the corresponding elements in order to avoid duplicated detailed description.

In the eighteenth embodiment, the drain terminal of a p-channel field effect transistor defining the overcurrent shut-off releasing switch 211 and the anode of a diode are connected to the gate terminal of the discharging control switch 91 and the resistor 94 with the other side of the resistor 94 being connected to the source terminal of the discharging control switch 91, the anode of the diode 92, the source terminal of the discharging control switch 13 and the anode of the diode 12.

On the other hand, the cathode of the diode 92 is connected to the drain terminal of the discharging control switch 91, the drain terminal of the discharging control switch 13, the cathode of the diode 12, the drain terminal of the charging control switch 15 and the cathode of the diode 14.

Now, description will be made assuming that the control IC 7 has a function to hold the charging control switch 15 in the ON condition when in the overcurrent shut-off condition.

In case when voltage is applied between the external minus terminal 17 and the external plus terminal 5, for example, by connecting a charger or the like between such terminals 17 and 5, the overcurrent shut-off releasing switch 211 is switched on only for a first given time. The voltage on the external plus terminal 5 is applied to the gate terminal of the discharging control switch 91 for switching it on.

Accordingly, the battery minus terminal 4 and the external minus terminal 17 are connected together for making the voltage between the negative side power supply terminal 10 of the control IC 7 and the overcurrent voltage detection terminal (or voltage supply terminal) 23 approximately zero (0) volt and returning the control IC 7 to the normal condition.

On the other hand, the resistor 94 acts to hold the gate terminal voltage of the discharging control switch 91 approximately zero (0) volt when the overcurrent shut-off releasing switch 211 is in the OFF condition.

Figure 20:
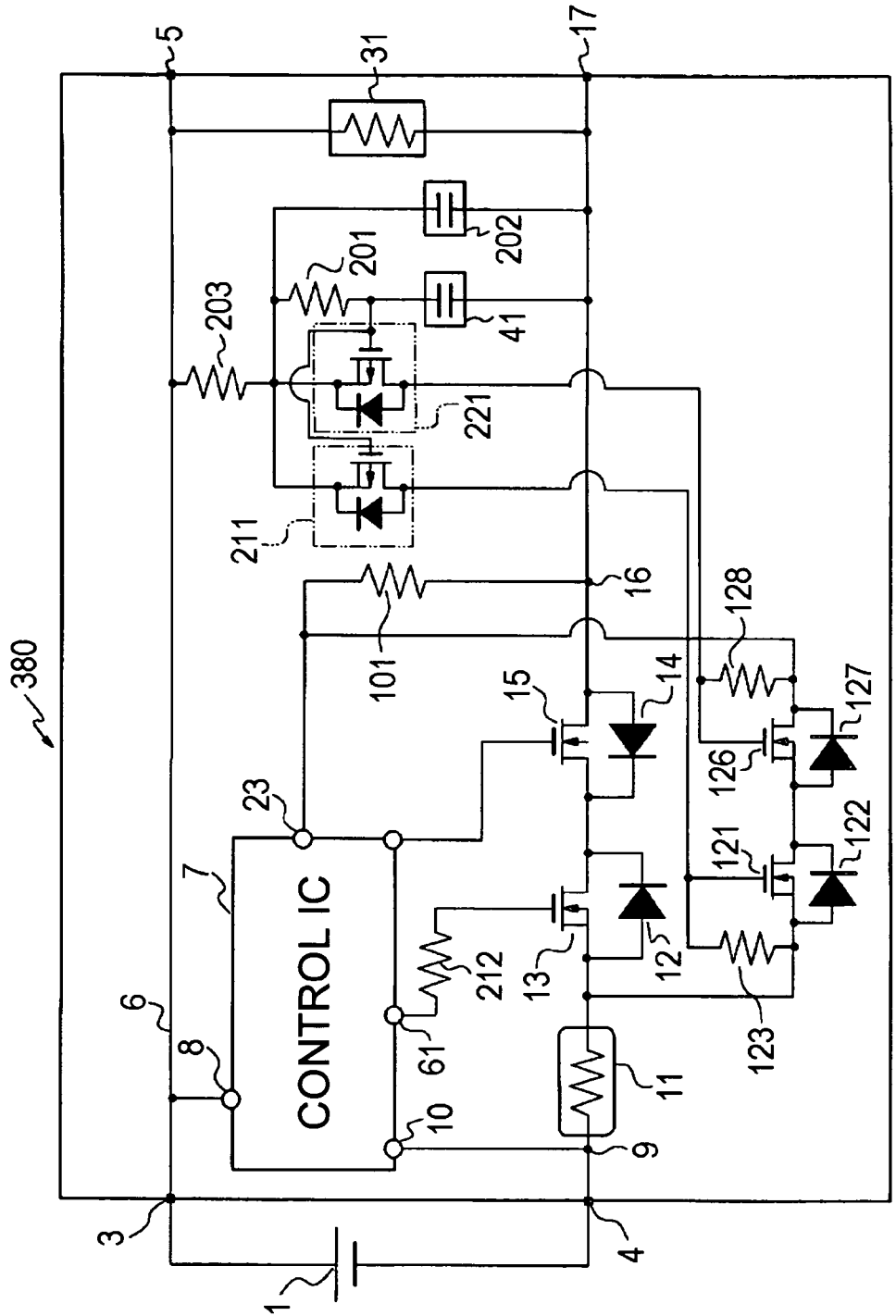
FIG. 20 is a simplified circuit schematic of a nineteenth embodiment of the battery pack protection circuit according to the present invention.

FIG. 20 is a simplified circuit schematic of a nineteenth embodiment of the battery pack protection circuit 380 according to the present invention. In the nineteenth embodiment, the diodes 125 and 130 in the ninth embodiment are eliminated and an overcurrent shut-off releasing switch 221 and a resistor 212 are added. Since the other construction is the same as the first and the ninth embodiments, the same reference numerals as the first and the ninth embodiments are used for the corresponding elements in order to avoid duplicated detailed description.

In the nineteenth embodiment, the drain terminal of a p-channel field effect transistor and the anode of a diode defining the overcurrent shut-off releasing switch 211 are connected to the gate terminal of the overcurrent shut-off releasing switch 121 and the resistor 123 and the drain terminal of a p-channel field effect transistor and the anode of a diode defining the overcurrent shut-off releasing switch 221 are connected to the gate terminal of the overcurrent shut-off recovering switch 126 and the resistor 128.

Also, the discharging switch connection signal 61 from the control IC 7 is applied to the gate terminal of the discharging control switch 13 by way of the resistor 212.

In the above circuit configuration, when the control IC 7 is in the overcurrent shut-off condition, the overcurrent shut-off can be recovered even if there is a function to hold the charging control switch 15 I the OFF condition.

When voltage is applied between the external minus terminal 17 and the external plus terminal 5, for example, by connecting a charger or the like between these terminals 17 and 5, the overcurrent shut-off releasing switches 211 and 221 are switched on only for a first given time. The voltage on the external plus terminal 5 is applied to the gate terminals of the overcurrent shut-off recovering switches 121 and 126 for switching on the overcurrent shut-off recovering switches 121 and 126.

As a result, the battery minus terminal 4 and the external minus terminal 17 are connected together for making the voltage between the negative side power supply terminal 10 of the control IC 7 and the overcurrent voltage detection terminal (or voltage supply terminal) 23 approximately zero (0) volt and the control IC 7 to recover the normal condition.

Figure 21:
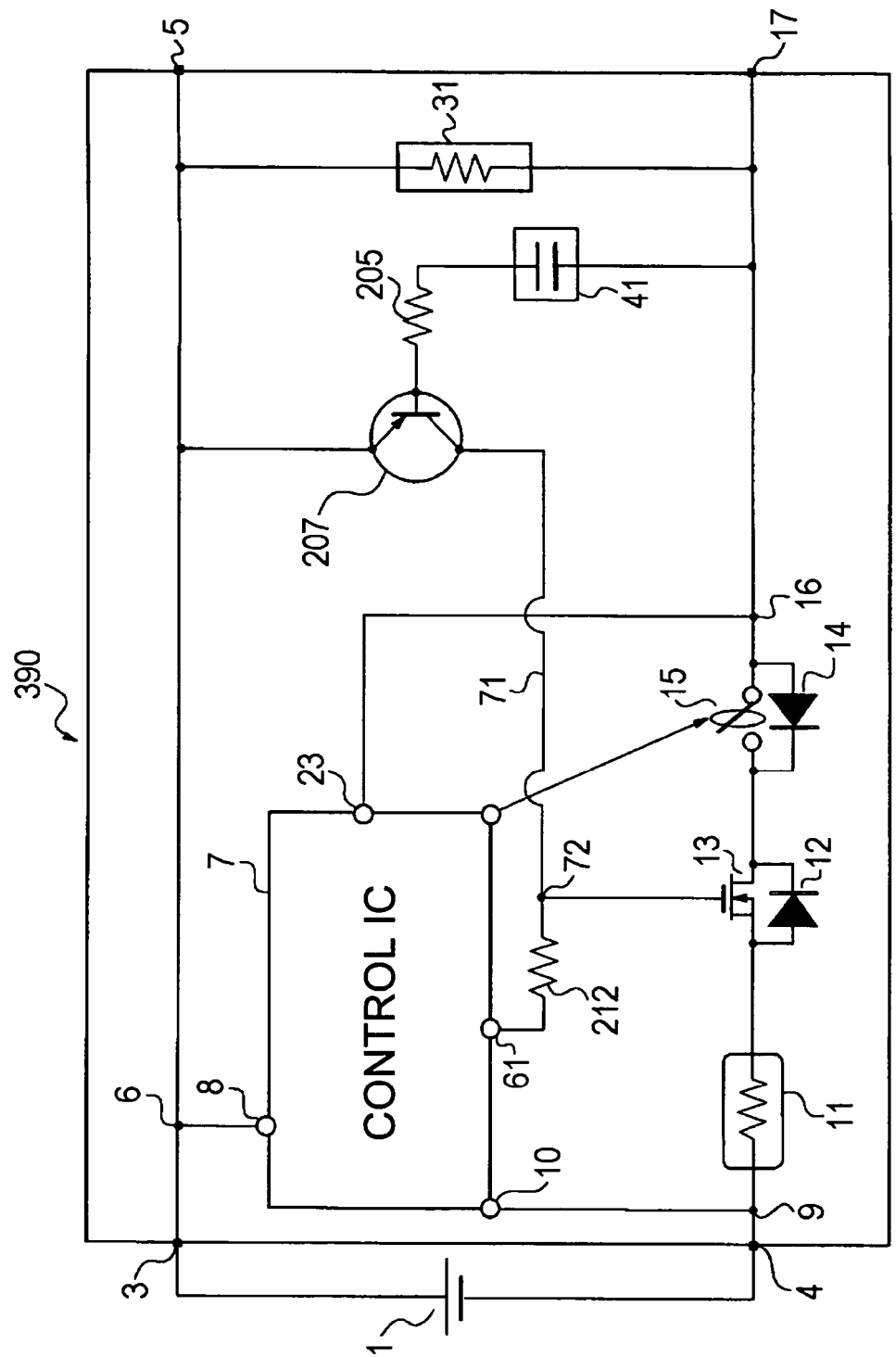
FIG. 21 is a simplified circuit schematic of a twentieth embodiment of the battery pack protection circuit according to the present invention.

FIG. 21 is a simplified circuit schematic of a twentieth embodiment of the battery pack protection circuit 390 according to the present invention. In the twentieth embodiment, the overcurrent shut-off releasing switch 211 and the resistor in the twelfth embodiment are eliminated and an overcurrent shut-off releasing switch (transistor) 207 and a resistor 207 are added. Since the other construction is the same as the first and the twelfth embodiments, the same reference numerals as the first and the twelfth embodiments are used for the corresponding elements in order to avoid duplicated detailed description.

In the twentieth embodiment, the external minus terminal 17 is connected to the base terminal of the overcurrent shut-off releasing switch (transistor) 207 by way of a series connection of the differentiation circuit 41 and the resistor 205. For example, a PNP junction transistor or the like may be used as the overcurrent shut-off releasing switch 207.

On the other hand, the emitter terminal of the overcurrent shut-off releasing switch 207 is connected to the external plus terminal 5 and the collector terminal of the overcurrent shut-off releasing switch 207 is connected to the gate terminal of the discharging control switch (Field Effect Transistor) 13 and the resistor 212 by way of the discharge switch signal junction 72.

Figure 22:
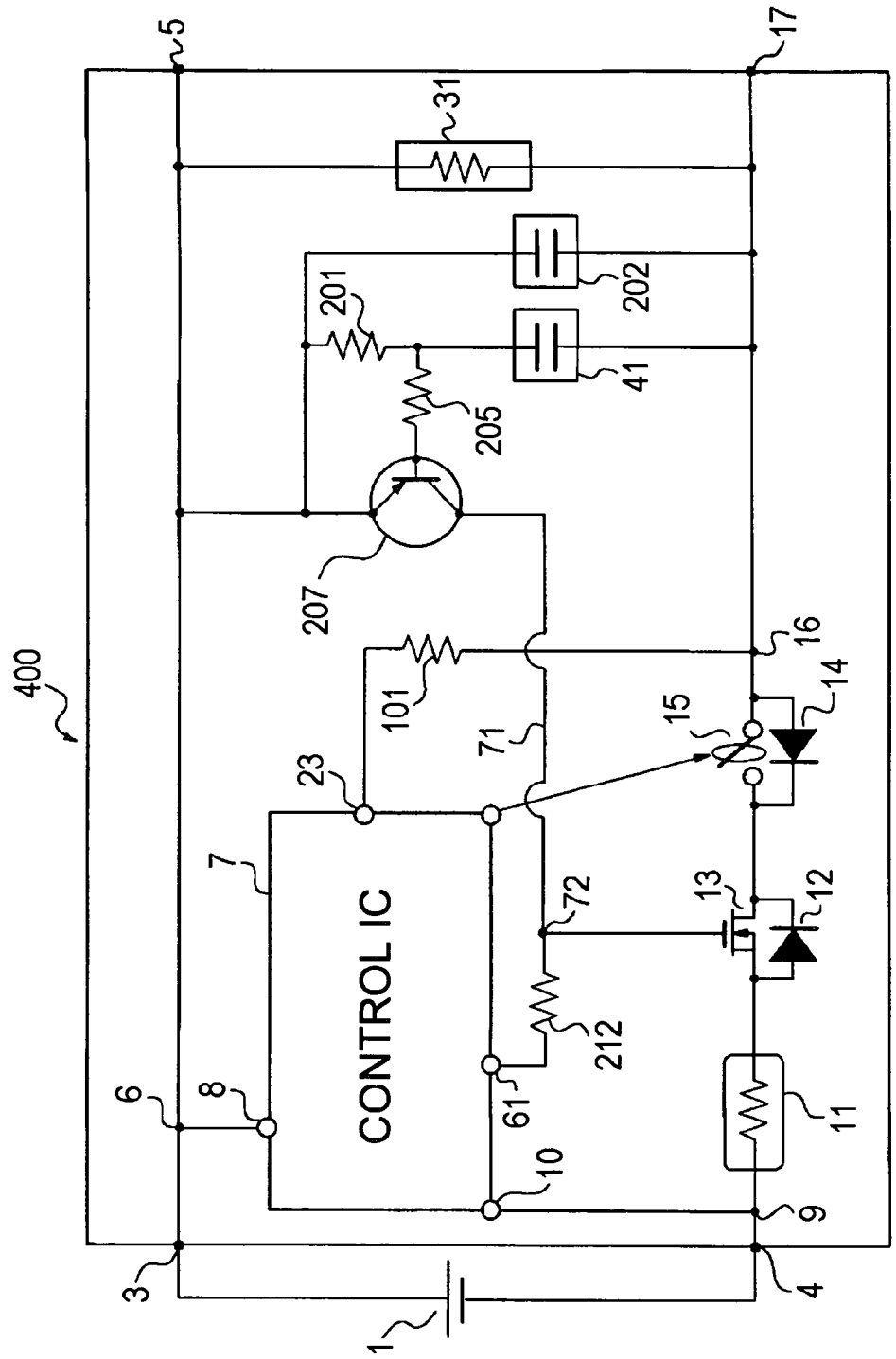
FIG. 22 is a simplified circuit schematic of a twenty-first embodiment of the battery pack protection circuit according to the present invention.

FIG. 22 is a simplified circuit schematic of a twenty-first embodiment of the battery pack protection circuit 400 according to the present invention. In the twenty-first embodiment, a resistor 201 and a voltage smoother (capacitor) 202 are added to the twentieth embodiment. Since the other construction is the same as the first and the twentieth embodiments, the same reference numerals as the first and the twentieth embodiments are used for the corresponding elements in order to avoid duplicated detailed description.

In the twenty-first embodiment, one end of the voltage smoother 8 capacitor) 202 is connected to the external minus terminal 17 while the other end is connected to the resistor 201 and the emitter terminal of the overcurrent shut-off releasing switch 207. The resistor 201 is connected to the differentiation circuit 41 and the resistor 205.

By adding the resistor 201 and the voltage smoother (capacitor) 202 in the manner as described above, when switching from the condition in which an abnormally low resistor such as, for example, a metal wire, a chain or the like is connected between the external minus terminal 17 and the external plus terminal 5 (i.e., shorted condition) to the open condition, it is possible to make the overcurrent shut-off releasing switch 207 not to be switched to the ON condition.

Figure 23:
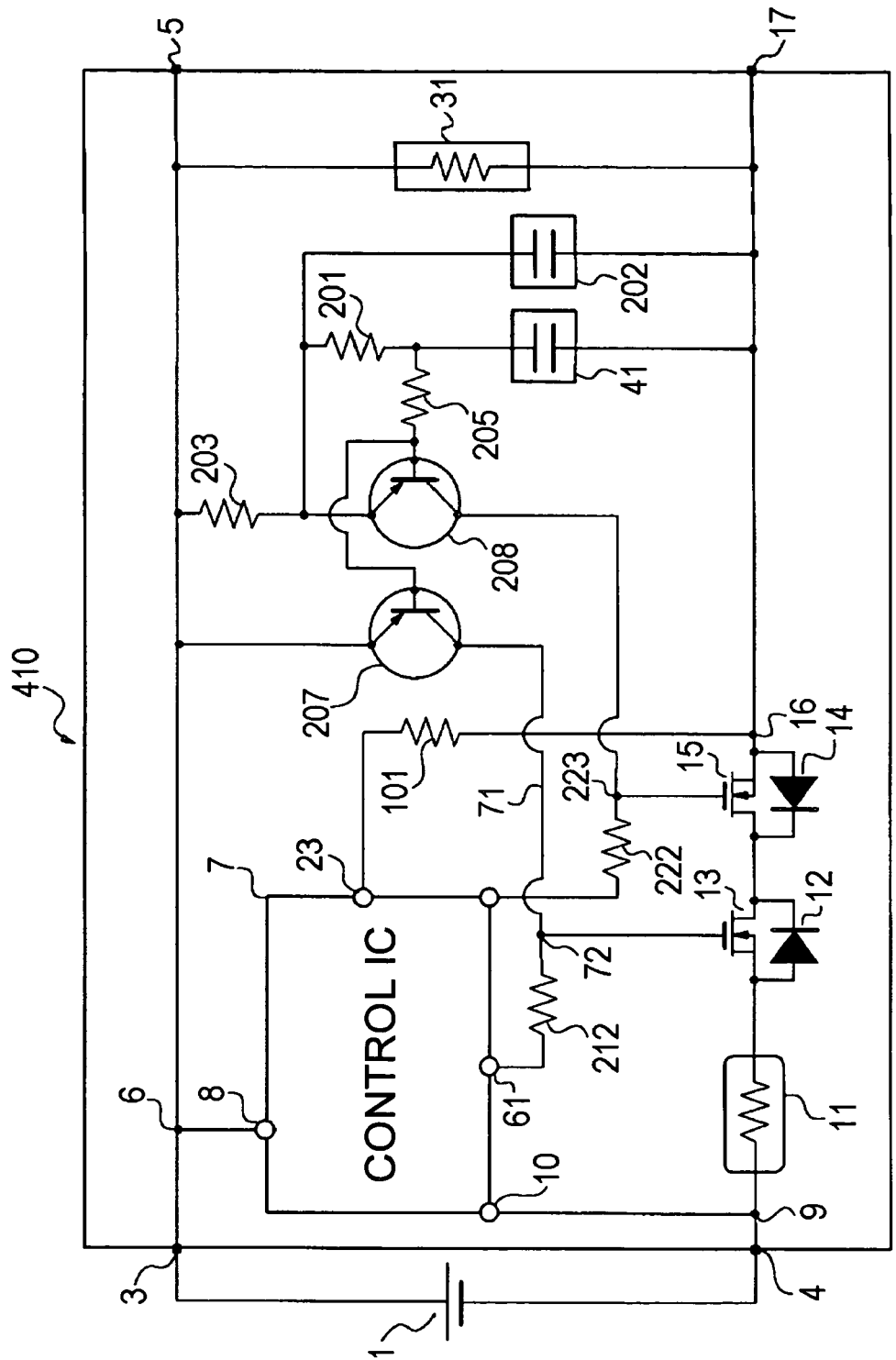
FIG. 23 is a simplified circuit schematic of a twenty-second embodiment of the battery pack protection circuit according to the present invention.

FIG. 23 is a simplified circuit schematic of a twenty-second embodiment of the battery pack protection circuit 410 according to the present invention. In the twenty-second embodiment, the overcurrent shut-off releasing switches 211 and 221 in the sixteenth embodiment are replaced by overcurrent shut-off releasing switches 207 and 208. Since the other construction is the same as the first and the sixteenth embodiments, the same reference numerals as the first and the sixteenth embodiments are used for the corresponding elements in order to avoid duplicated detailed description.

In the twenty-second embodiment, the external plus terminal 5 is connected to the emitter terminal of the overcurrent shut-off releasing transistor 207 and one end of the resistor 203 with the other end thereof being connected to the emitter terminal of the overcurrent shut-off releasing switch 208, the resistor 201 and the voltage smoother (capacitor) 202.

The base terminals of the overcurrent shut-off releasing switches 207 and 208 are connected in common to the resistor 205. The collector terminal of the overcurrent shut-off releasing switch 207 is connected to the gate terminal of the discharging control switch (Field Effect Transistor) 13 and the resistor 212 by way of the discharge switch signal junction 72 while the collector terminal of the overcurrent shut-off releasing switch 208 is connected to the gate terminal of the charging control switch (Field Effect Transistor) 15 and the resistor 222 by way of the charging switch signal junction 223.

Figure 24:
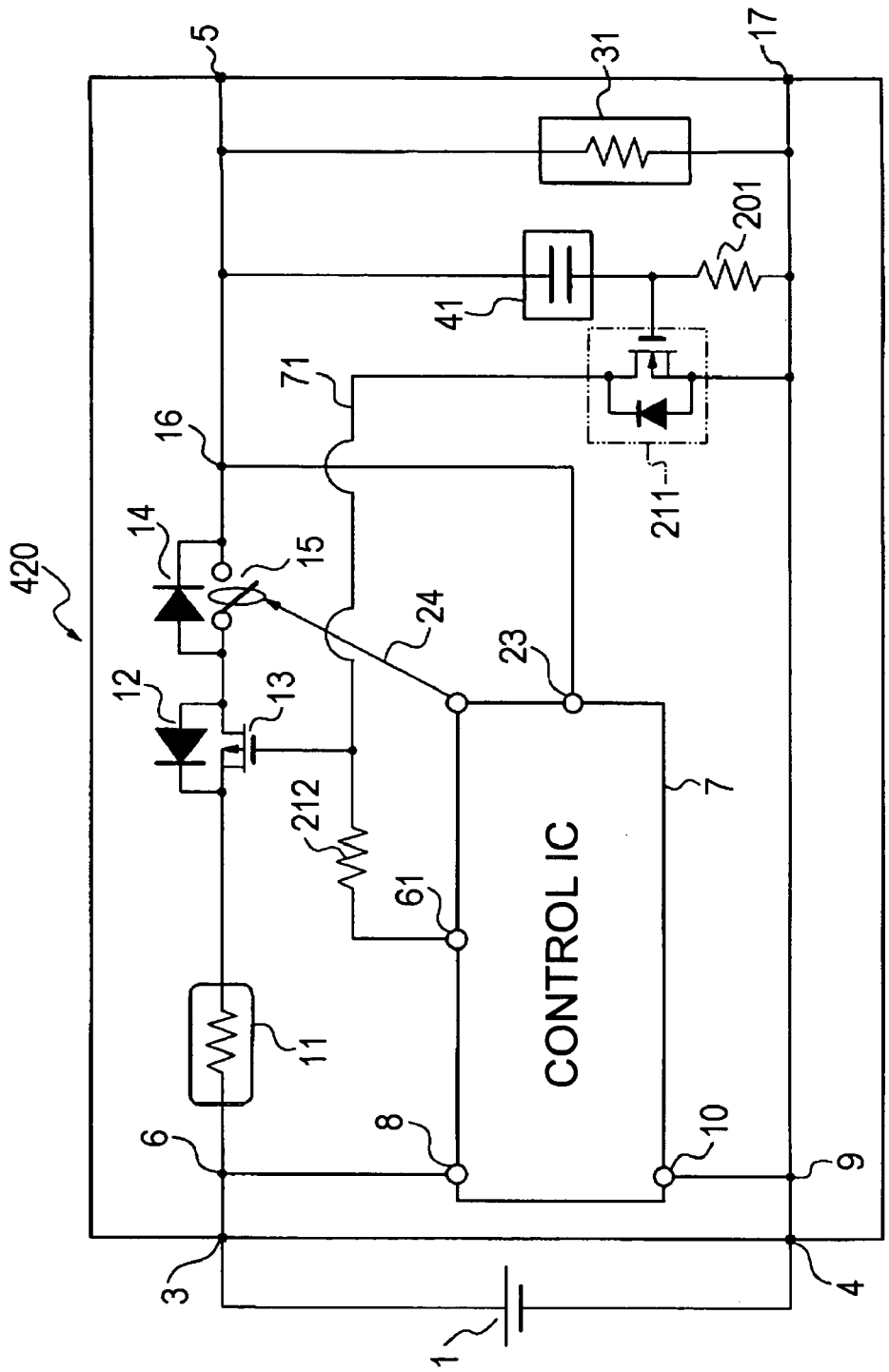
FIG. 24 is a simplified circuit schematic of a twenty-third embodiment of the battery pack protection circuit of the present invention.

FIG. 24 is a simplified circuit schematic of a twenty-third embodiment of the battery pack protection circuit 420 according to the present invention. In the twenty-third embodiment, the external plus terminal 5 and the external minus terminal 17 in the twelfth embodiment are interchanged. Since the other construction is the same as the first embodiment, the same reference numerals as the first embodiment are used for the corresponding elements in order to avoid duplicated detailed description.

In the twenty-third embodiment, as compared to the circuit schematic of the battery pack in the twelfth embodiment as shown in FIG. 13, the discharging control switch 13 and the charging control switch 15 are connected to the external plus terminal 5 side.

The overcurrent shut-off releasing switch (Field Effect Transistor) 211 is an n-channel field effect transistor while the discharging control switch 13 is a p-channel field effect transistor. The source terminal of the overcurrent shut-off releasing switch (Field Effect Transistor) 211 is connected to the external minus terminal 17. The drain terminal of the overcurrent shut-off releasing switch (Field Effect Transistor) 211 is connected to the gate terminal of the discharging control switch 13.

Figure 25:
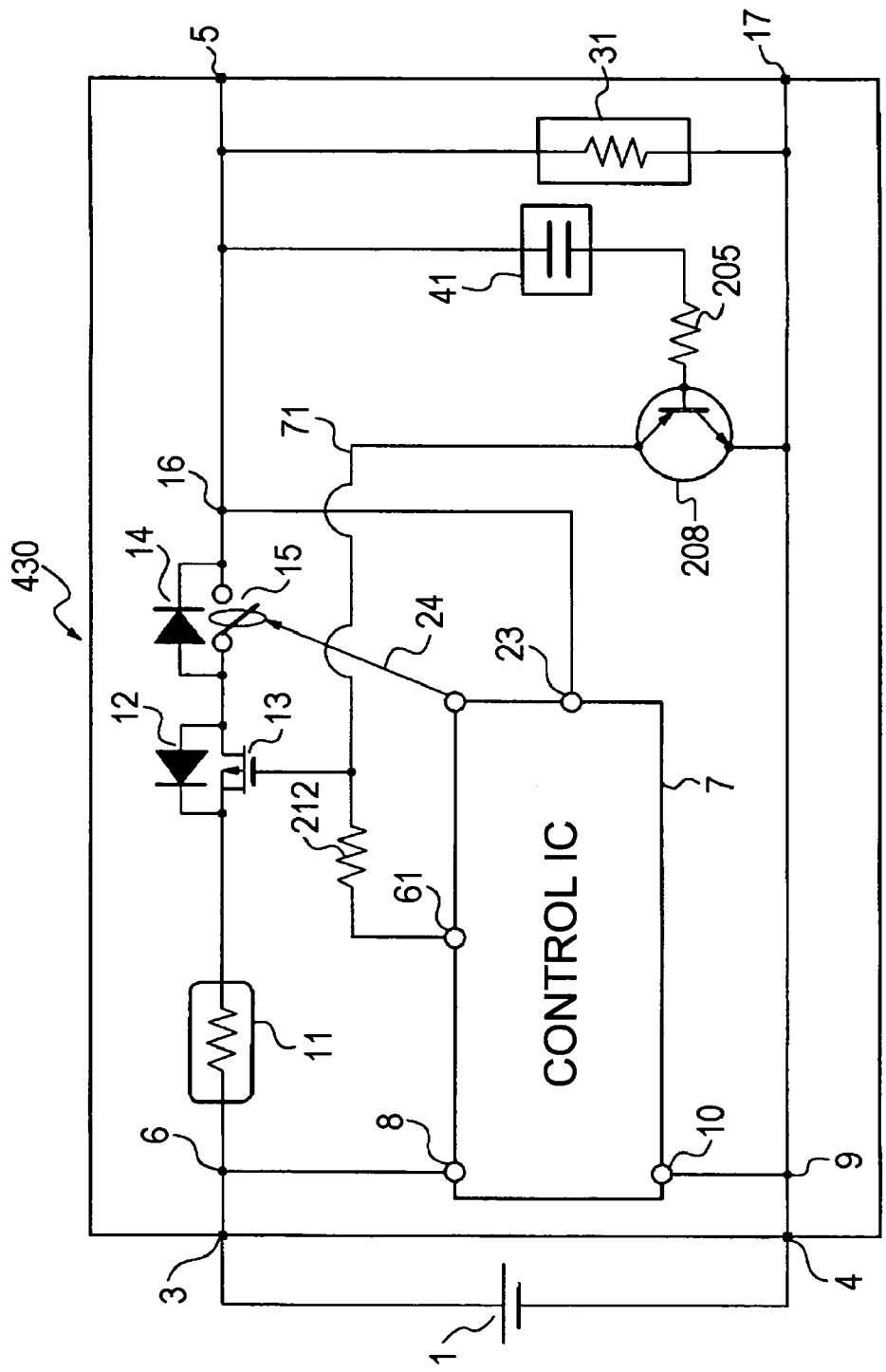
FIG. 25 is a simplified circuit schematic of a twenty-fourth embodiment of the battery pack protection circuit according to the present invention.

FIG. 25 is a simplified circuit schematic of a twenty-fourth embodiment of the battery pack protection circuit 430 according to the present invention. In the twenty-fourth embodiment, the overcurrent shut-off releasing switch (Field Effect Transistor) 211 in the twenty-third embodiment is replaced by an overcurrent shut-off releasing switch (transistor) 208. Since the other construction is the same as the first embodiment, the same reference numerals as the first embodiment are used for the corresponding elements in order to avoid duplicated detailed description.

In the twenty-fourth embodiment, as compared to the circuit schematic of the battery pack in the twenty-third embodiment as shown in FIG. 24, an overcurrent shut-off switch (Field Effect Transistor) 208 is disposed in place of the overcurrent shut-off releasing switch (field effect transistor) 211.

The overcurrent shut-off releasing switch (transistor) 208 is an NPN junction transistor. The emitter terminal of the overcurrent shut-off releasing switch (transistor) 208 is connected to the external minus terminal 17 while the base terminal thereof is connected to a series connection of the resistor 205 and the differentiation circuit (capacitor) 41.

Also, the differentiation circuit (capacitor) 41 is connected to the external plus terminal 5. The collector terminal of the overcurrent shut-off releasing switch (transistor) 208 is connected to the gate terminal of the discharging control switch (Field Effect Transistor) 13.

Figure 26:
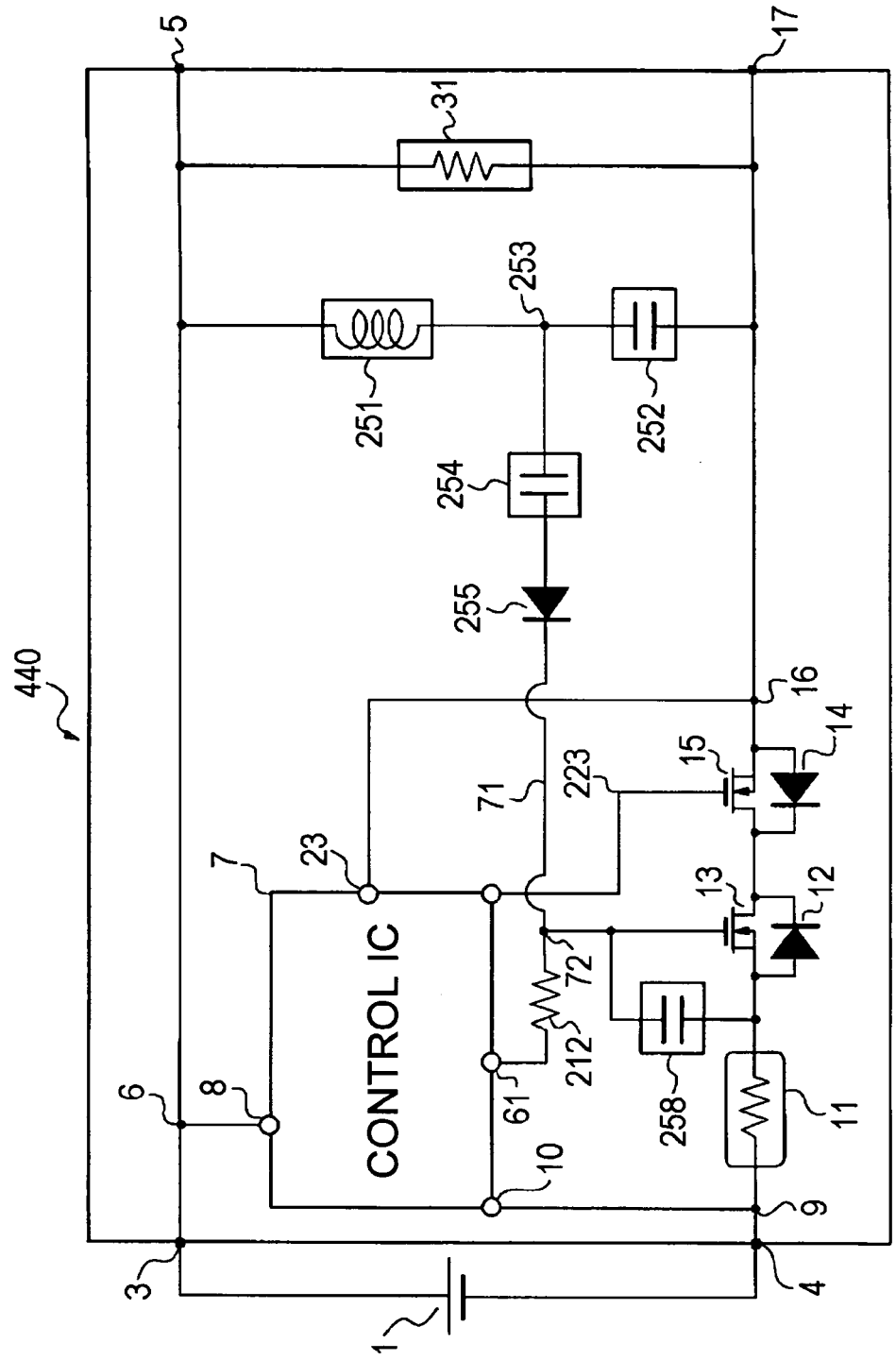
FIG. 26 is a simplified circuit schematic of a twenty-fifth embodiment of the battery pack protection circuit according to the present invention.

FIG. 26 is a simplified circuit schematic of a twenty-fifth embodiment of the battery pack protection circuit 440 according to the present invention. In the twenty-fifth embodiment, the overcurrent shut-off releasing switch 211 and the resistor 201 in the twelfth embodiment are eliminated and an inductor 251, a capacitor 252, a capacitor 254, a capacitor 258 and a diode 255 are added. Since the other construction is the same as the first and the twelfth embodiments, the same reference numerals as the first and the twelfth embodiments are used for the corresponding elements in order to avoid duplicated detailed description.

In the twenty-sixth embodiment, one end of the inductor 251 is connected to the external plus terminal 5 while the other end is connected to one ends of the capacitor 252 and the capacitor 254 by way of a junction 253. The other end of the capacitor 252 is connected to the external minus terminal 17.

On the other hand, the other end of the capacitor 254 is connected to the anode side of the diode 255 while the cathode side of the diode 255 is a resistor 212, one end of a capacitor 258 and the gate terminal of the discharging control switch 13. The other end of the capacitor 258 is connected to the source terminal of the discharging control switch 13, the anode of the diode 12 and the resistor 11.

When a voltage is applied between the external minus terminal 17 and the external plus terminal 5, current flows through the capacitor 252 and the inductor 251 for only a first given time. When voltage across the capacitor 252 increases to a level which is close to the voltage between the external minus terminal 17 and the external plus terminal 5, the current through the capacitor 252 is shut off.

As a result, voltage approximately 2 volts or higher is developed in the inductor 251, thereby increasing the voltage between the external minus terminal 17 and the junction 253 to approximately 6 volts or higher. The voltage between the source terminal and the gate terminal of the discharging control switch 13 becomes approximately 2 volts or higher and thus switching on the discharging control switch 13.

The battery minus terminal 4 and the external minus terminal 17 are connected together and the voltage between the negative side power supply terminal 10 of the control IC 7 and the overcurrent voltage detection terminal (or voltage supply terminal) 23 is approximately zero (0) volt, thereby returning the control IC 7 to the normal condition.

Preferably, the inductor 251 has a capacitance in the range of approximately 1 mH to 50 mH while the capacitors 252, 254 have a capacitance in the range of approximately 1 μF to 1000 μF. On the other hand, it is preferable that the capacitor 258 has a capacitance in the range of approximately 0.001 μF to 10 μF while the resistor 212 has a resistance in the range of 10 kΩ to 500 kΩ.

Figure 27:
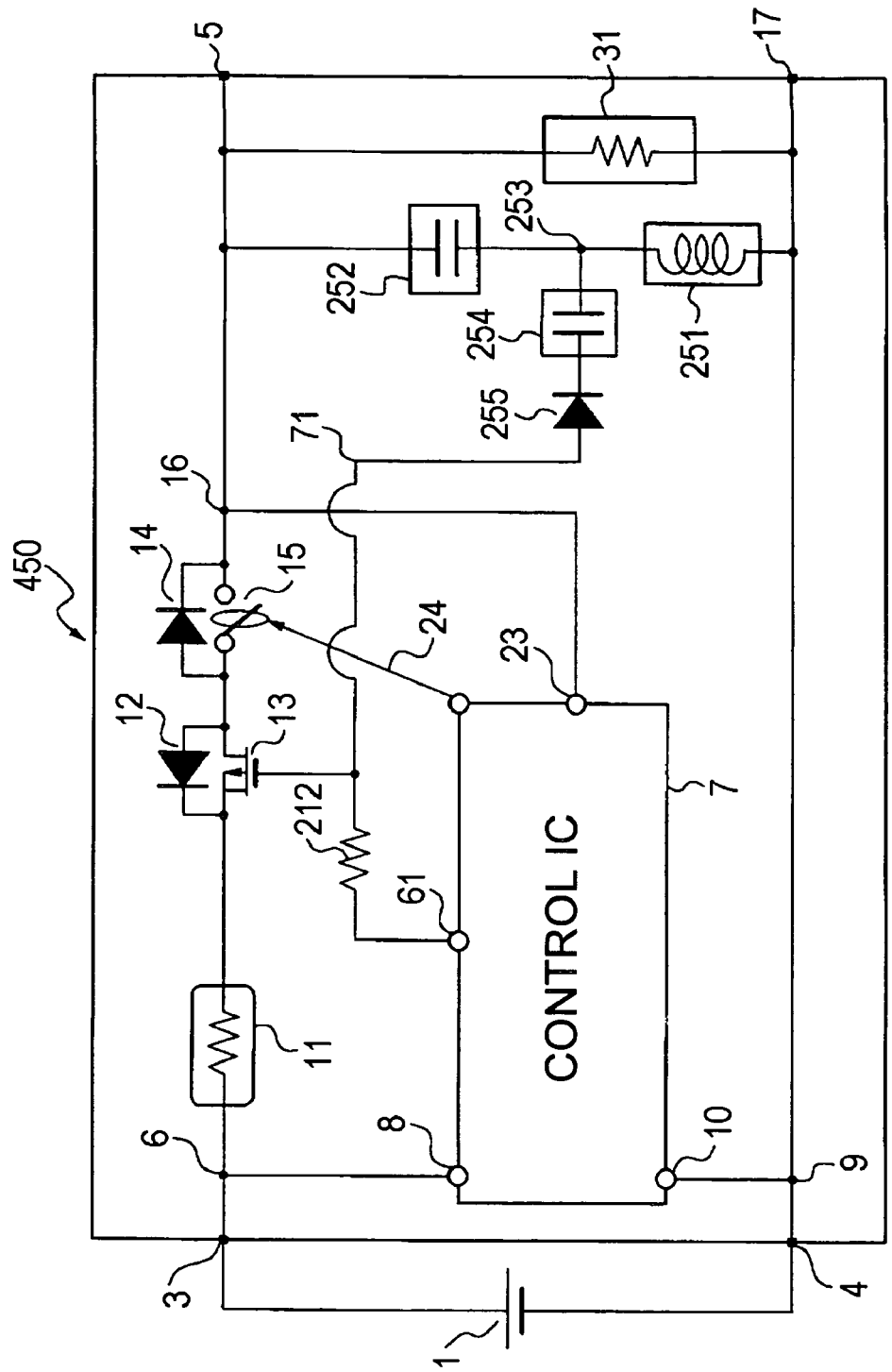
FIG. 27 is a simplified circuit schematic of a twenty-sixth embodiment of the battery pack protection circuit according to the present invention.

FIG. 27 is a simplified circuit schematic of a twenty-sixth embodiment of the battery pack protection circuit 450 according to the present invention. In the twenty-sixth embodiment, the external plus terminal 5 and the external minus terminal 17 in the twenty-fifth embodiment are interchanged. Since the other construction is the same as the first and the twenty-fifth embodiments, the same reference numerals as the first and the twenty-fifth embodiments are used for the corresponding elements in order to avoid duplicated detailed description.

In the twenty-sixth embodiment, as compared to the battery pack circuit schematic of the twenty-fifth embodiment as shown in FIG. 26, the discharging control switch (Field Effect Transistor) 13 is disposed at the battery plus terminal side. Accordingly, the circuit portion for releasing overcurrent shut-off also differs.

The inductor 251 and the capacitor 252 are connected in series and one end of the capacitor 252 is connected to the external plus terminal 5 while one end of the inductor 251 is connected to the external minus terminal 17. The junction 253 of the inductor 251 and the capacitor 253 is connected to the capacitor 254. The capacitor 254 and the diode 255 are connected in series with the capacitor 254 being connected to the cathode of the diode 255 and the anode of the diode 255 being connected to the switch control terminal of the discharging control switch 13.

When voltage is applied between the external minus terminal 17 and the external plus terminal 5, currents flows through the capacitor 252 and the inductor 251 only for a first given time. When voltage across the capacitor 252 increases to a level close to the voltage between the external minus terminal 17 and the external plus terminal 5, the current through the capacitor 252 is interrupted and approximately 2 volts develops across the inductor 251. The voltage across the external minus terminal 17 and the junction 253 becomes approximately −2 volts or lower which is then applied to the gate terminal of the discharging control switch 13. This makes the voltage between the source terminal and the gate terminal of the discharging control switch 14 approximately −2 volts or lower, thereby switching on the discharging control switch 13.

In the above circuit configuration, the battery plus terminal 3 and the external plus terminal 5 are connected together. As a result, voltage between the negative side power terminal 10 and the overcurrent voltage detection terminal (or voltage supply terminal) 23 becomes approximately zero (0) volt and thus the control IC 7 returns to the normal condition.

Figure 28:
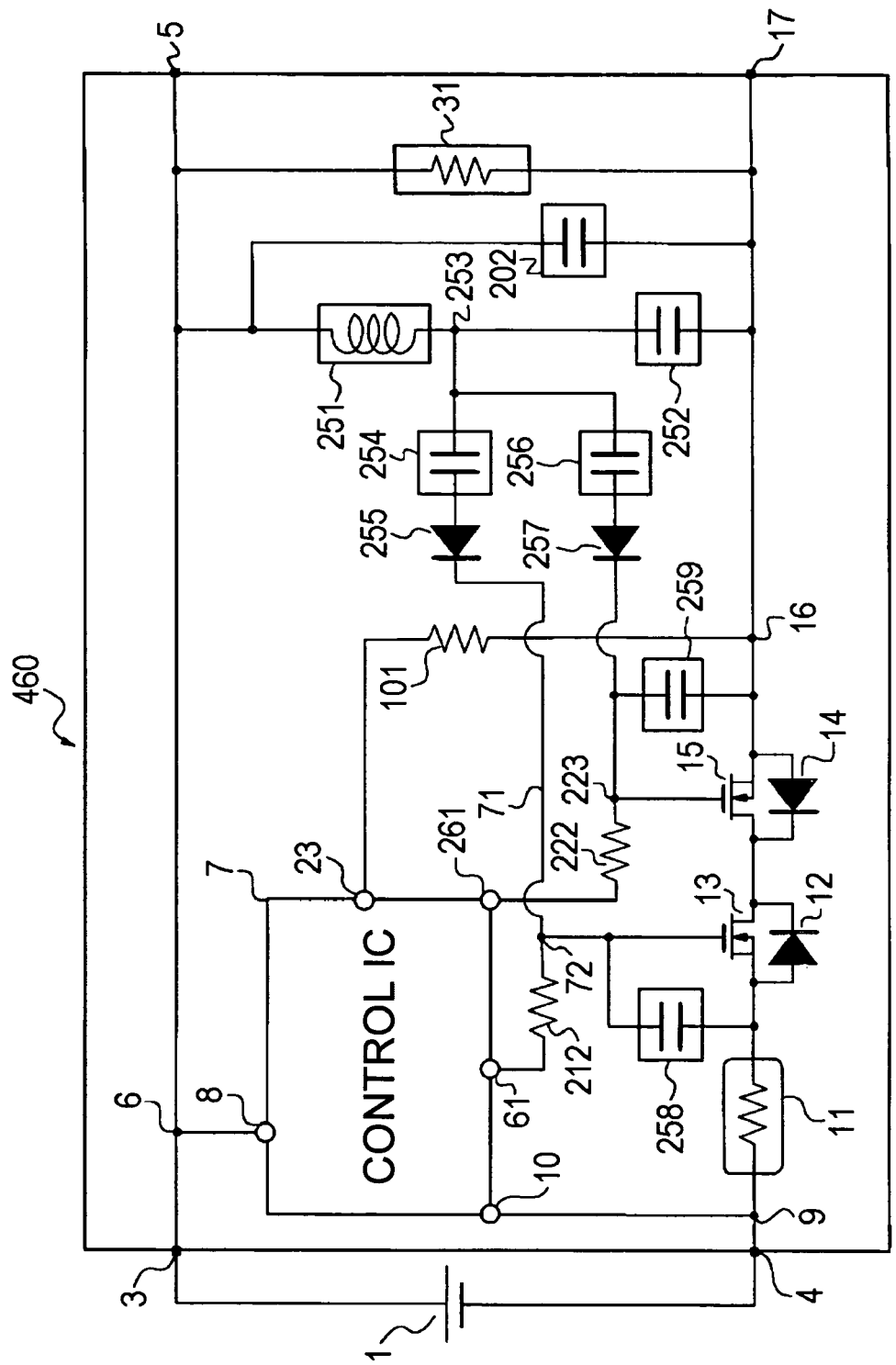
FIG. 28 is a simplified circuit schematic of a twenty-seventh embodiment of the battery pack protection circuit according to the present invention.

FIG. 28 is a simplified circuit schematic of a twenty-seventh embodiment of the battery pack protection circuit 460 according to the present invention. The twenty-seventh embodiment is a combination of the seventeenth embodiment and the twenty-fifth embodiment. Since the other construction is the same as the first and the seventeenth embodiments, the same reference numerals as the first and the seventeenth embodiments are used for the corresponding elements in order to avoid duplicated detailed description.

In the twenty-seventh embodiment, one ends of capacitors 254 and 256 are connected to the junction 253 of the inductor 251 and the capacitor 252 with the other end of the capacitor 256 being connected to the anode of the diode 257. The cathode of the diode 257 is connected to the gate terminal of the charging control switch 15, one end of the resistor 222 and one end of the capacitor 259 by way of the charging switch signal junction 223. The other end of the capacitor 259 is connected to the external minus terminal 17.

In the twenty-seventh embodiment, when, for example, a charger or the like is connected between the external plus terminal 5 and the external minus terminal 17, the circuit operates so that the discharging control switch 13 and the charging control switch 15 are in the ON condition for a given time.

The circuit is effective in the case when the control IC 7 has a function to hold the voltage of the charging control 261 approximately zero (0) volt in the overcurrent shut-of condition. When voltage is applied between the external minus terminal 17 and the external plus terminal 5, the discharging control switch 13 and the charging control switch 15 are switched on only for a first given time to connect between the battery minus terminal 4 and the external minus terminal 17. Then, the voltage between the negative side power supply terminal 10 and the overcurrent voltage detection terminal (or voltage supply terminal) 23 becomes approximately zero (0) volt, thereby recovering the control IC 7 to the normal condition.

In summary, by using either one or any combination of the embodiments according to the present invention, when the external plus terminal 5 and the external minus terminal 17 are shorted, discharging is interrupted. And even if such short-circuit or the like is released, the discharging is kept interrupted until a predetermined voltage such as, for example, a charger or the like is applied between the external plus terminal 5 and the external minus terminal 17.

It is to be noted that, although all of the above embodiments are described to have only one battery cell 1, it is possible that the battery cell 1 comprises more than one connected in series or parallel.

What is claimed is:

1. A battery pack including at least a battery cell and a protection circuit for shutting off overcurrent discharge to a load, said protection circuit comprising:
   an integrated circuit including a overvoltage detection unit;
   a discharging shut-off switch controlled by the integrated circuit and connected in series with the load;
   a diode wired in parallel to said discharging shut-off switch; and
   a shut-off holding unit connected between the battery cell positive terminal and an external negative terminal of the protection circuit, comprising (a) resistor block of resistance larger than 1 kΩ and smaller than 200 kΩ; and (b) a detector in parallel with the resistor block for detecting voltage between an external plus terminal and the external minus terminal, wherein, the overvoltage detection unit detects an abnormal discharge of the battery caused by shorting or connecting a low resistance between the external plus terminal and the external minus terminal, the discharge shut-off switch opens in response to a abnormal discharge, the shut-off holding unit maintains the discharge shut-off in the open position, and said discharge shut-off switch closes to recover discharge upon detection by the shut-off holding unit of a predetermined voltage between the external plus terminal and the external minus terminal of the battery pack.

2. The battery pack as cited in claim 1, wherein said detector is one of a charger detector, a voltage detector, a voltage change detector, an A.C. resistance detector, and a voltage dropper.

3. The battery pack as cited in claim 1, wherein said detector is connected to one of a differentiation circuit, and an one-shot circuit.

4. The battery pack as cited in claim 1, wherein said discharging shut-off switch is connected between the battery cell negative terminal and the external minus terminal.

5. The battery pack as cited in claim 1, wherein said discharging control switch is connected between the battery cell positive terminal and the external plus terminal.

* * * * *